United States Patent
Kaya

(10) Patent No.: US 12,291,419 B2
(45) Date of Patent: May 6, 2025

(54) TRANSPORT DEVICE FOR INSTANT FILM, PRINTER, AND DIGITAL CAMERA INCLUDING PRINTER

(71) Applicant: FUJIFILM Corporation, Tokyo (JP)

(72) Inventor: Akimasa Kaya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 198 days.

(21) Appl. No.: 17/936,659

(22) Filed: Sep. 29, 2022

(65) Prior Publication Data

US 2023/0024154 A1    Jan. 26, 2023

Related U.S. Application Data

(63) Continuation of application No. PCT/JP2021/012962, filed on Mar. 26, 2021.

(30) Foreign Application Priority Data

Mar. 31, 2020    (JP) .................................. 2020-063918

(51) Int. Cl.
    *B65H 29/12*      (2006.01)
    *B65H 5/06*      (2006.01)
    (Continued)

(52) U.S. Cl.
    CPC ............. *B65H 5/062* (2013.01); *B65H 27/00* (2013.01); *H04N 1/2154* (2013.01);
    (Continued)

(58) Field of Classification Search
    CPC ........ B65H 5/062; B65H 27/00; B65H 29/12; B65H 29/125; B65H 2511/12;
    (Continued)

(56) References Cited

U.S. PATENT DOCUMENTS 6,682,069 B2 *   1/2004   Shibabuki ................ B65H 5/06
                                                                     271/274
7,213,986 B2 *   5/2007   Watanabe .................. B41J 3/36
                                                                       400/58

(Continued)

FOREIGN PATENT DOCUMENTS

JP    S63-052840 U    4/1988
JP    2001330893 A    11/2001
(Continued)

OTHER PUBLICATIONS

The extended European search report issued by the European Patent Office on Aug. 2, 2023, which corresponds to European Patent Application No. 21779408.0-1020 and is related to U.S. Appl. No. 17/936,659.

(Continued)

*Primary Examiner* — Luis A Gonzalez
(74) *Attorney, Agent, or Firm* — Studebaker Brackett PLLC

(57) ABSTRACT

A transport roller pair that includes a capstan roller and a pinch roller is provided. The capstan roller includes a rotational shaft, a pair of spike roller members that are arranged at intervals from each other so as to correspond to a dimension of a first instant film in a width direction, and a sub roller member that is disposed at an interval with respect to the spike roller member so as to correspond to a dimension of a second instant film in a width direction.

7 Claims, 25 Drawing Sheets

(51) Int. Cl.
*B65H 27/00* (2006.01)
*H04N 1/21* (2006.01)

(52) U.S. Cl.
CPC .. *B65H 2404/1115* (2013.01); *B65H 2801/12* (2013.01); *H04N 2201/0082* (2013.01)

(58) Field of Classification Search
CPC ...... B65H 2404/133; B65H 2404/1115; B65H 2701/1719; G03B 17/52; G03B 17/32; G07B 1/32; B41J 3/36; B41J 3/4075; B41J 13/076
See application file for complete search history.

(56) References Cited

U.S. PATENT DOCUMENTS

| | | | | |
|---|---|---|---|---|
| 7,744,209 | B2 * | 6/2010 | Nakashima | B41J 11/007 347/213 |
| 2002/0033870 | A1 | 3/2002 | Takahashi et al. | |
| 2018/0231874 | A1 * | 8/2018 | Nakai | G03D 9/00 |
| 2019/0084317 | A1 | 3/2019 | Fujii et al. | |
| 2019/0361336 | A1 * | 11/2019 | Nakai | G03B 17/50 |

FOREIGN PATENT DOCUMENTS

| | | |
|---|---|---|
| JP | 2002006411 A | 1/2002 |
| JP | 2002-087635 A | 3/2002 |
| JP | 2003295300 A | 10/2003 |
| JP | 2005-300838 A | 10/2005 |
| WO | 2018/008191 A1 | 1/2018 |

OTHER PUBLICATIONS

International Search Report issued in PCT/JP2021/012962; mailed May 25, 2021.

International Preliminary Report on Patentability (Chapter I) and Written Opinion of the International Searching Authority issued in PCT/JP2021/012962; issued Sep. 29, 2022.

* cited by examiner

TRANSPORT DEVICE FOR INSTANT FILM, PRINTER, AND DIGITAL CAMERA INCLUDING PRINTER

CROSS-REFERENCE TO RELATED APPLICATIONS

This application is a Continuation of PCT International Application No. PCT/JP2021/012962 filed on 26 Mar. 2021, which claims priority under 35 U.S.C § 119(a) to Japanese Patent Application No. 2020-063918 filed on 31 Mar. 2020. The above application is hereby expressly incorporated by reference, in its entirety, into the present application.

BACKGROUND OF THE INVENTION

1. Field of the Invention

The present invention relates to a transport device for an instant film, a printer using the same, and a digital camera including a printer.

2. Description of the Related Art

Various mobile printers or digital cameras including a printer for recording images captured by a digital camera or a smartphone on a recording medium such as an instant film have been on sale.

In a case where the instant film is transported as the recording medium, a transport roller pair transports the instant film in a state of pinching both side edge portions of the instant film such that a developer pod containing developer and an exposure surface are not crushed. A capstan roller constituting the transport roller pair is provided with a pair of roller members at both ends of a rotational shaft, and these roller members are slidably in contact with both the side edge portions of the instant film (see JP2005-300838A).

On the other hand, JP2002-87635A (corresponding to US2002/033870A1) describes a digital camera including a printer provided with a media pack that can be attached to and detached from a main body of an apparatus. Images can be recorded on recording media of different sizes by exchanging media packs. A transport roller or the like is incorporated in the media pack, and the recording medium can be discharged to the outside of the media pack by rotating the transport roller.

SUMMARY OF THE INVENTION

There are instant films having various sizes as the recording medium, and in particular, a square type instant film and a card type instant film are in great demand Thus, the present applicant has examined a printer or a digital camera including a printer capable of using two types of instant films having a large demand such as a square type and a card type and having different sizes.

However, in the printer or the digital camera including a printer of the related art described in JP2005-300838A, in a case where two types of instant films having different sizes are used, even though the roller members are arranged so as to correspond to a dimension of one instant film in a width direction, the roller members are arranged so as not to correspond to a dimension of the other instant film in a width direction. Accordingly, although one instant film can be transported, it may be difficult to transport the other instant film, or the roller member may crush the developer pod or the like.

On the other hand, although the digital camera including a printer described in JP2002-87635A can record images on a plurality of types of recording media, in a case where the size of the recording medium is to be changed, the media pack incorporating the transport roller or the like needs to be replaced. Thus, it takes a time and an effort for a replacement work, and the cost is increased by the amount of parts such as the transport roller incorporated in the media pack. Such a media pack is not a popular product, but a dedicated part for a specific type of printer or digital camera including a printer. In a case where the media pack is forgotten or lost, images cannot be recorded.

The present invention has been made to solve the above-mentioned problems, and an object of the present invention is to provide a transport device for an instant film, a printer, and a digital camera including a printer capable of using two types of instant films at low cost without taking an effort of a replacement work.

In order to solve the above problems, a transport device for an instant film according to an embodiment of the present invention includes a transport roller pair. A capstan roller includes a rotational shaft, a pair of spike roller members that are provided at both ends of the rotational shaft and have a plurality of convex portions on a circumferential surface, the pair of spike roller members being arranged at intervals from each other so as to correspond to a dimension of a first instant film in a width direction, and a sub roller member that is provided at the rotational shaft, and is positioned between the pair of spike roller members, the sub roller member being disposed at an interval with respect to one of the pair of spike roller members so as to correspond to a dimension of a second instant film in a width direction, the pair of spike roller members and the pinch roller transport the first instant film in a state of pinching both side edge portions of the first instant film, and one of the pair of spike roller members and the pinch roller transport the second instant film in a state where one of the pair of spike roller members and the pinch roller pinch one of side edge portions of the second instant film and the sub roller member is slidably in contact with the other of the side edge portions of the second instant film. The transport roller pair includes the capstan roller, and the pinch roller facing the capstan roller, and transports any one of the first instant film or the second instant film having a smaller dimension in the width direction than the first instant film in a transport direction orthogonal to the width direction by rotation of the capstan roller and the pinch roller.

It is preferable that the transport device for an instant film further includes a first positioning unit that aligns the first instant film so as to correspond to a position at which both the side edge portions of the first instant film are slidably in contact with the pair of spike roller members in a case where the transport roller pair transports the first instant film, and a second positioning unit that aligns the second instant film so as to correspond to a position at which one of the side edge portions of the second instant film is slidably in contact with one of the pair of spike roller members and a position at which the other of the side edge portions of the second instant film is slidably in contact with the sub roller in a case where the transport roller pair transports the second instant film.

It is preferable that the sub roller member is formed in a smooth curved surface shape in which a cross section cut along a plane including an axial direction and a diametrical direction is convex outward.

It is preferable that in a case where an average value of a maximum outer diameter including a distal end of the convex portion of the spike roller member and a minimum outer diameter not including the convex portion is an effective outer diameter of the spike roller member, an outer diameter of the sub roller member is smaller than the effective outer diameter and is larger than the outer diameter of the rotational shaft.

It is preferable that a dimension of the sub roller member in a width direction is smaller than a dimension of the spike roller member in a width direction.

A printer according to an embodiment of the present invention includes the transport device for an instant film, a spreading roller pair that spreads developer between a photosensitive sheet and a cover sheet by being disposed on a downstream side of the transport roller pair in the transport direction, and crushing a developer pod with the instant film interposed therebetween, and an exposure head that is provided on an upstream side of the spreading roller pair in the transport direction and irradiates an exposure surface of the instant film transported by the transport roller pair with line-shaped print light parallel to the width direction of the exposure surface. The instant film has a mask sheet, a photosensitive sheet pasted onto the mask sheet, a cover sheet pasted onto the photosensitive sheet and having a front surface side as an exposure surface, and a developer pod provided at a distal end portion in a transport direction orthogonal to a width direction of the exposure surface and containing developer.

A digital camera including a printer according to an embodiment of the present invention includes the printer, and an imaging unit that includes an imaging optical system, captures a subject image, and outputs image data to the printer.

According to the present invention, two types of instant films can be used at low cost without taking an effort of a replacement work.

DESCRIPTION OF THE PREFERRED EMBODIMENTS

[Overview of Digital Camera Including Printer]

Figure 1:
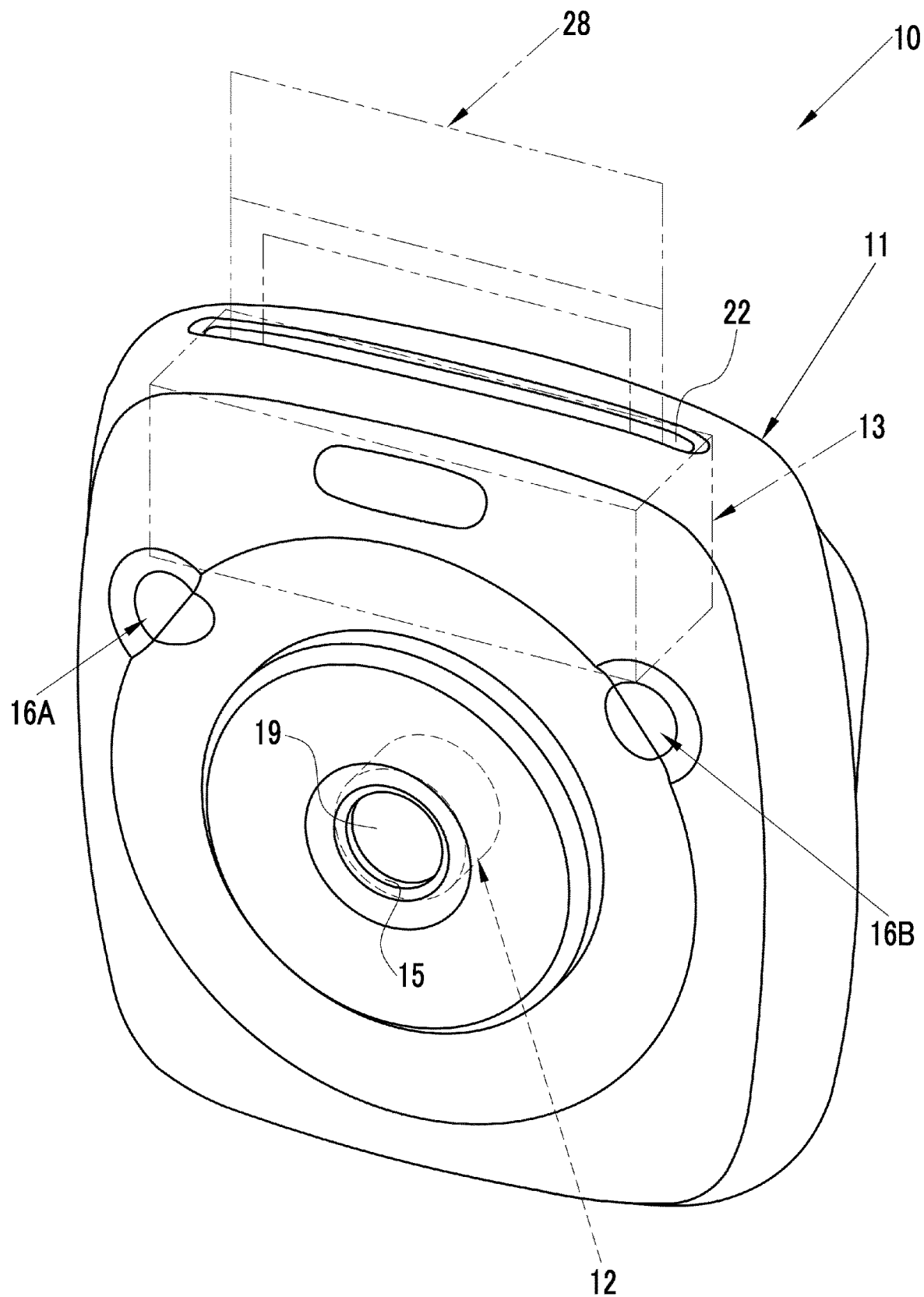
FIG. 1 is a front perspective view of a digital camera including a printer.

In FIG. 1, a digital camera 10 including a printer according to an embodiment of the present invention includes a camera body 11, an imaging unit 12, and a printer unit 13. An imaging window 15 and two release switches 16A and 16B are provided on a front surface of the camera body 11.

The camera body 11 has a substantially square shape viewed from a front surface. The digital camera 10 including a printer selectively uses any one of two types of instant films 28 and 29 (see FIGS. 9 and 13). The instant film 28 is a square type instant film, and the instant film 29 is a card type instant film. As will be described later, the instant film 29 has a dimension in a width direction X smaller than a dimension of the instant film 28, and has the same dimension in a transport direction.

The imaging window 15 is disposed in a center on the front surface of the camera body 11. The imaging window 15 exposes an imaging optical system 19 (see FIG. 3) constituting the imaging unit 12.

Figure 2:
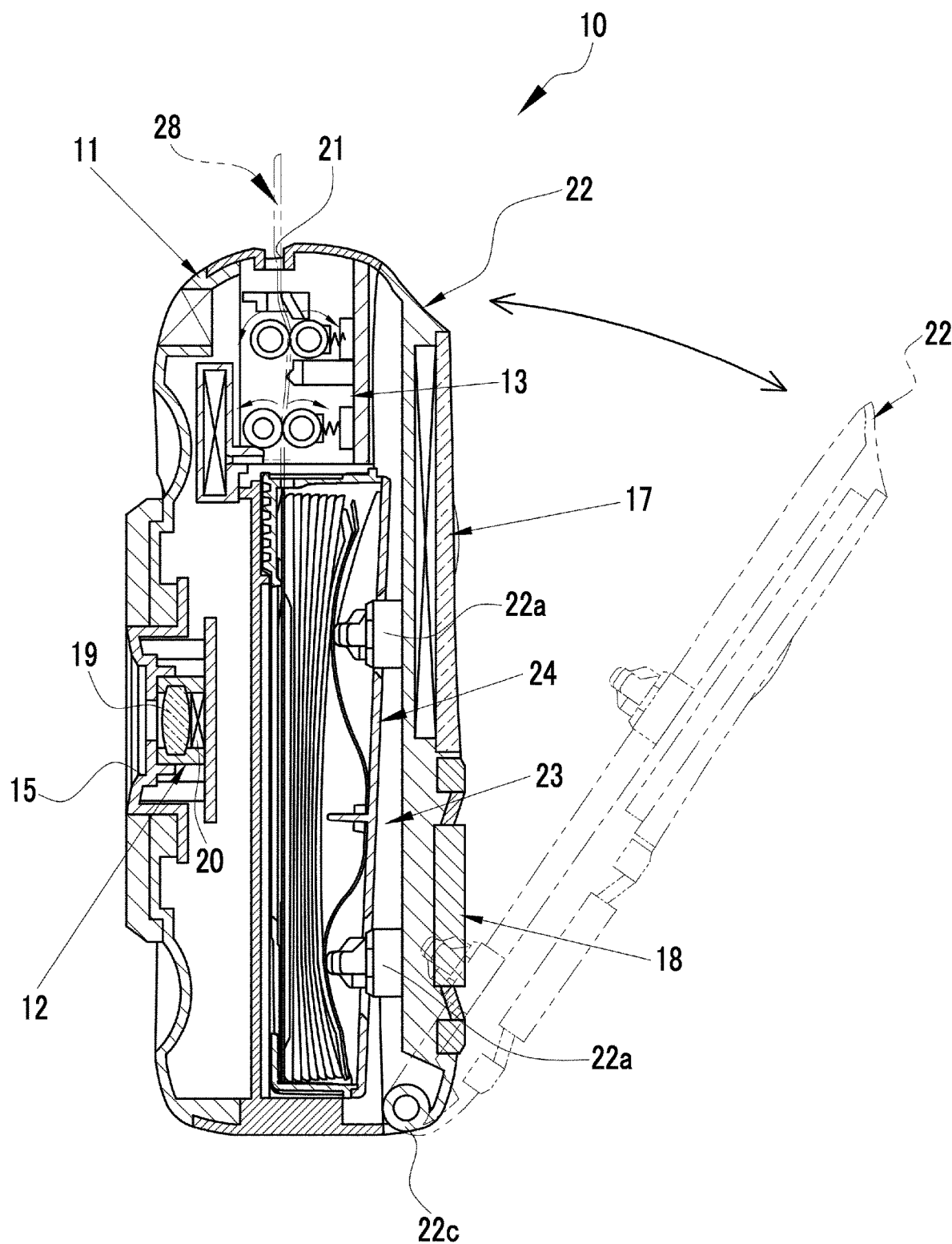
FIG. 2 is a longitudinal cross-sectional view of a center of the digital camera including a printer.

As shown in FIG. 2, the imaging optical system 19 and a solid-state imaging element 20 are provided in the imaging unit 12. For example, the solid-state imaging element 20 is a complementary metal-oxide-semiconductor (CMOS) image sensor, and includes a light receiving surface constituted by a plurality of pixels (not shown) arranged in a two-dimensional matrix shape. Each pixel includes a photoelectric conversion element, photoelectrically converts a subject image formed on the light receiving surface by the imaging optical system 19, and generates an imaging signal.

The solid-state imaging element 20 includes signal processing circuits (all not shown) such as a noise removal circuit, an auto gain controller, and an A/D conversion circuit. The noise removal circuit performs a noise removal process on the imaging signal. The auto gain controller amplifies a level of the imaging signal to an optimum value. The A/D conversion circuit converts the imaging signal into a digital signal, and outputs the digital signal to a built-in memory (not shown) from the solid-state imaging element 20. An output signal of the solid-state imaging element 20 is image data (so-called RAW data) having one color signal for each pixel.

The solid-state imaging element 20 is driven by pressing at least one of the release switch 16A or 16B, and the subject image is captured.

A film discharge port 21 is provided on a top surface of the camera body 11. The instant film 28 on which an image has been printed is discharged from the film discharge port 21.

Figure 3:
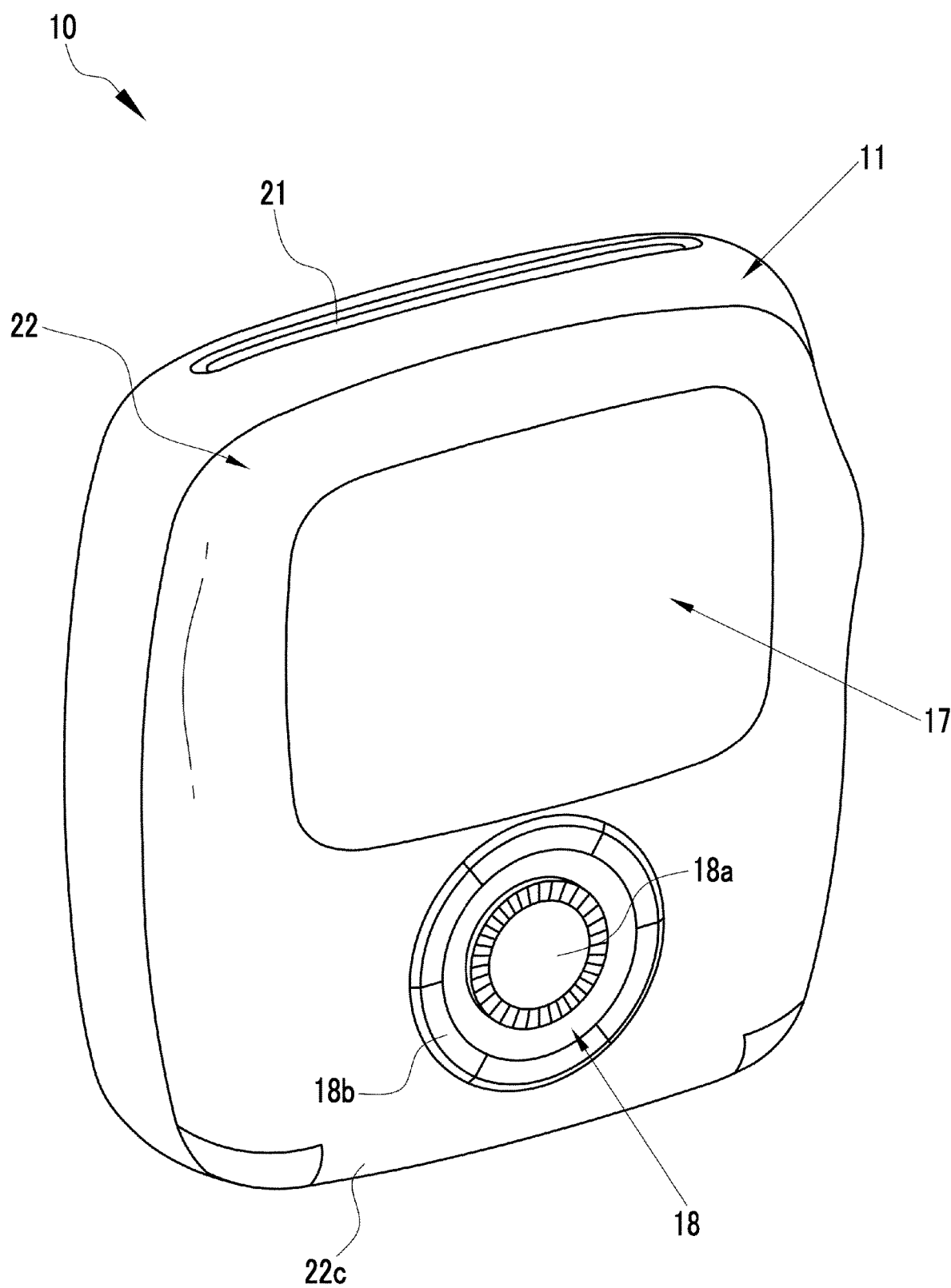
FIG. 3 is a rear perspective view of the digital camera including a printer with a loading cover in a closed position.

As shown in FIG. 3, a loading cover 22 is attached to a rear surface side of the camera body 11 through a hinge portion 22c. The hinge portion 22c rotatably supports the loading cover 22 between an opened position (state shown in FIG. 4) and a closed position (state shown in FIG. 3). The loading cover 22 opens a film pack room 23 within the camera body 11 in the opened position. The loading cover 22 covers the film pack room 23 in the closed position. A locking mechanism and an unlocking mechanism (all not shown) are provided between the camera body 11 and the loading cover 22, and in a case where the locking mechanism holds the loading cover 22 in the closed position and operates the unlocking mechanism, the loading cover 22 moves rotationally from the closed position to the opened position.

Figure 4:
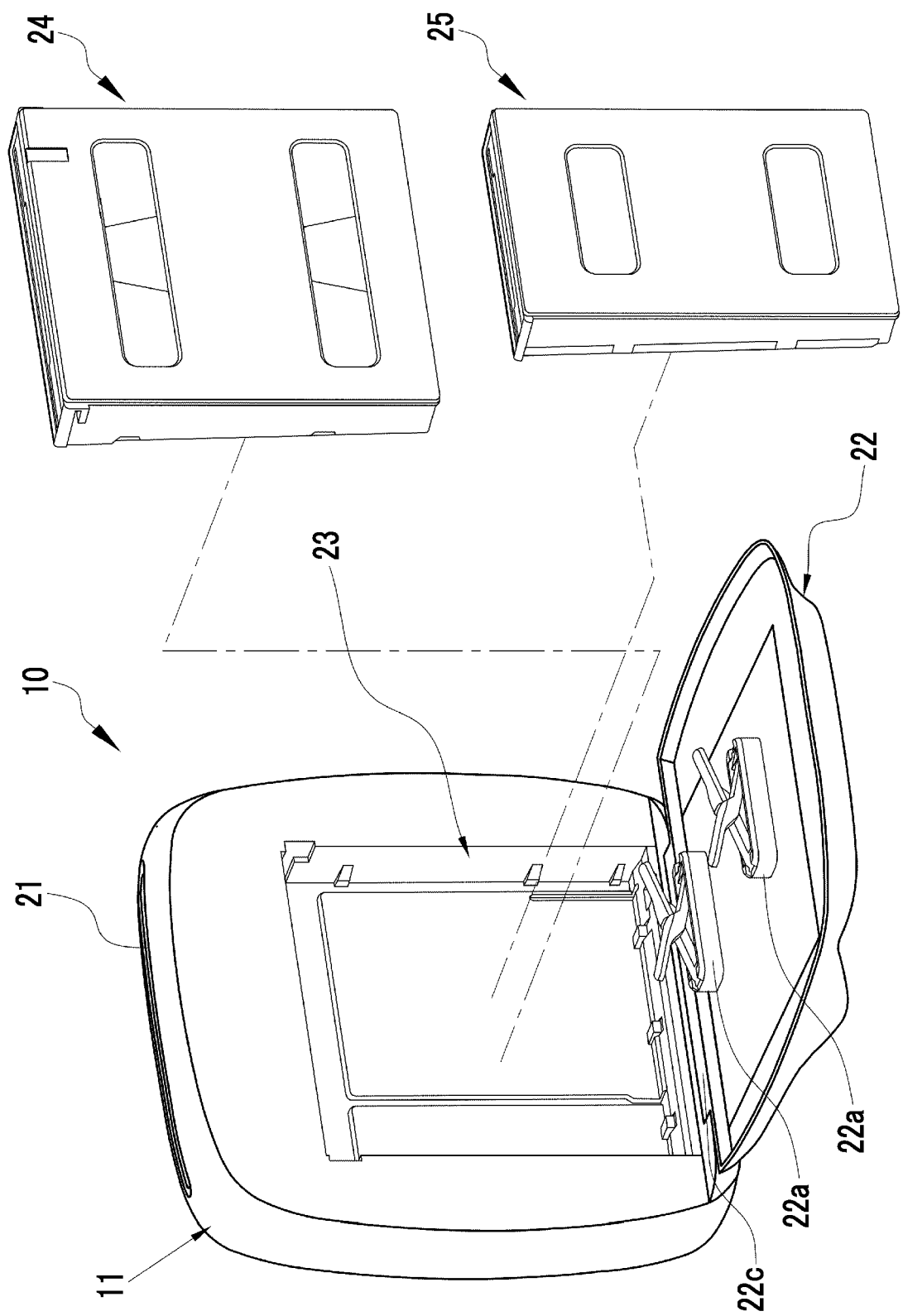
FIG. 4 is a rear perspective view of the digital camera including a printer with the loading cover in an opened position.

As shown in FIG. 4, any one of an instant film pack 24 that accommodates the instant film 28 or an instant film pack 25 that accommodates the instant film 29 is loaded into the film pack room 23. The user selects one of the instant film packs 24 and 25 that accommodate the instant films 28 and 29 that the user wants to use and loads the selected film pack into the film pack room 23. A pair of film holding portions 22a are provided on an inner surface of the loading cover 22. A detection switch 78 (see FIGS. 17 and 25) is provided in the film pack room 23.

A rear display unit 17 and an operation unit 18 are provided on an outer surface of the loading cover 22, that is, a rear surface of the camera body 11. The rear display unit 17 is, for example, a liquid crystal display (LCD) panel. Image data items corresponding to one frame output from the solid-state imaging element 20 are sequentially input into the rear display unit 17, and are displayed as a live preview image.

A photographer presses at least one of the release switch 16A or 16B, and thus, capturing is started. Image data items are acquired from the solid-state imaging element 20 through the capturing. An image processing unit (not shown) performs known image processing on the image data items, and then the image data items are compressed. Examples of the image processing include matrix operation, demosaicing, γ correction, luminance conversion, color difference conversion, and resizing. The image data items on which the image processing and the compression are performed are recorded in a built-in memory (not shown) such as a flash memory provided within the camera body 11.

In a case where a menu switch 18a of the operation unit 18 is pressed, the image is played and displayed on the rear display unit 17 based on the image data items recorded in the built-in memory. In a case where an image desired to be printed is displayed on the rear display unit 17, the photographer presses a print switch 18b of the operation unit 18, and thus, a printing process by the printer unit 13 is started.

[Configuration of Instant Film Pack]

Figure 5:
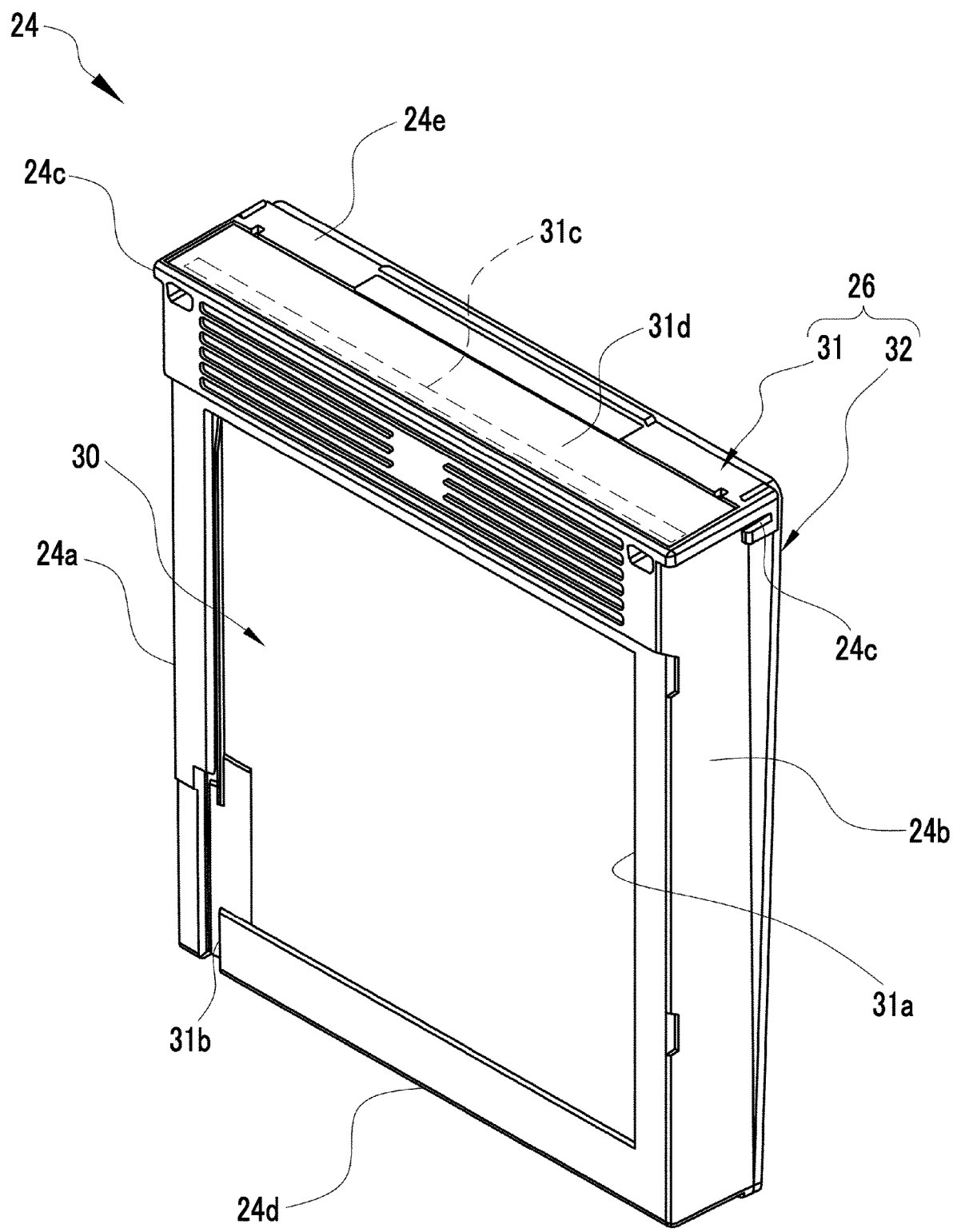
FIG. 5 is a perspective view of a first instant film pack.
Figure 6:
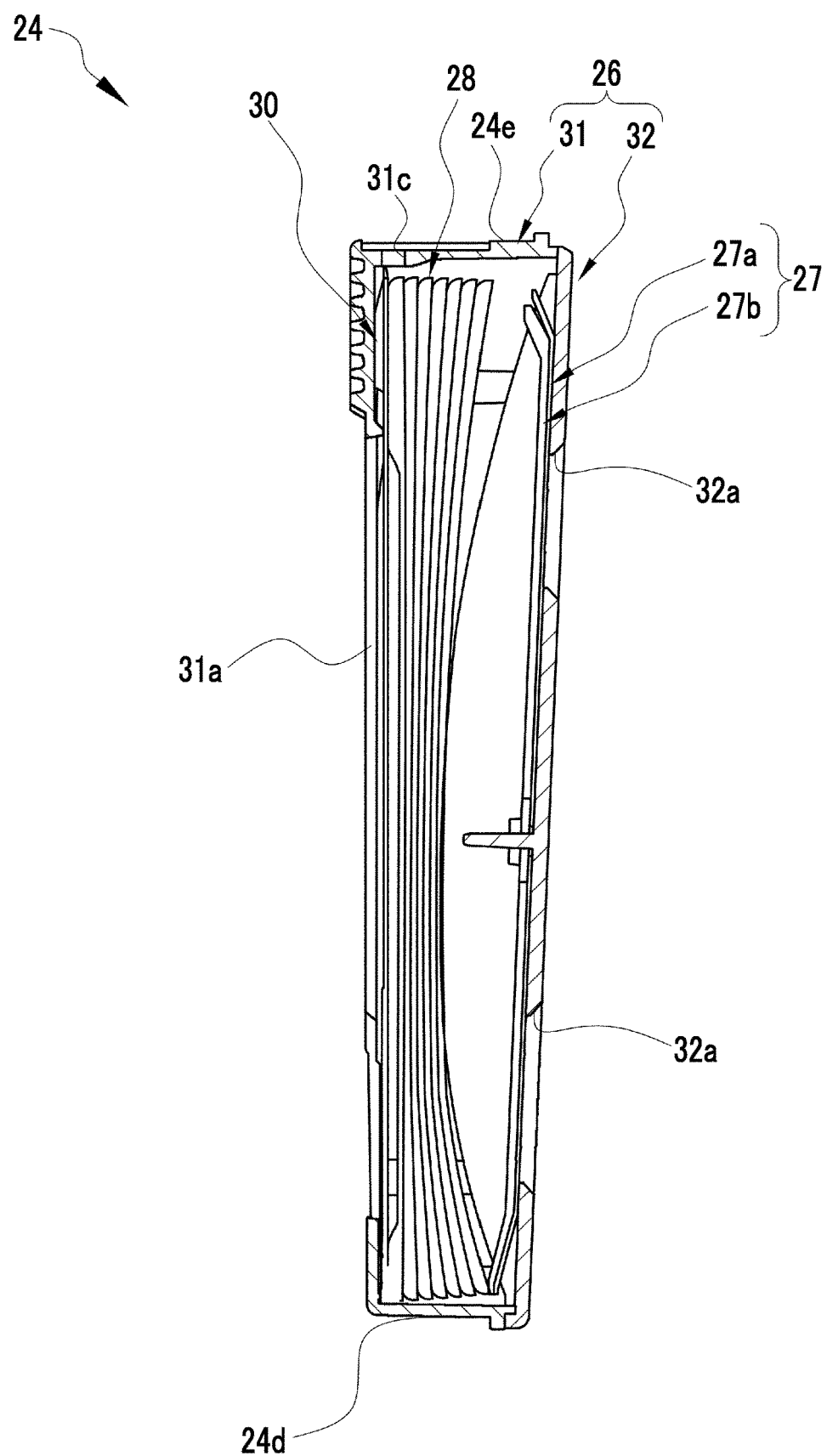
FIG. 6 is a cross-sectional view of the first instant film pack.

As shown in FIGS. 5 and 6, the instant film pack 24 includes a case 26, a film press plate 27, a plurality of instant films 28, and a film cover 30.

As shown in FIG. 6, the case 26 accommodates the plurality of instant films 28 and one film cover 30 in a stacking manner. The case 26 is made of a material such as a thermoplastic resin or a paper resin acquired by mixing the thermoplastic resin with cellulose. The case 26 includes a box-shaped case member 31, and a cover 32 that covers an opening formed in a rear surface side of the case member 31.

Figure 7:
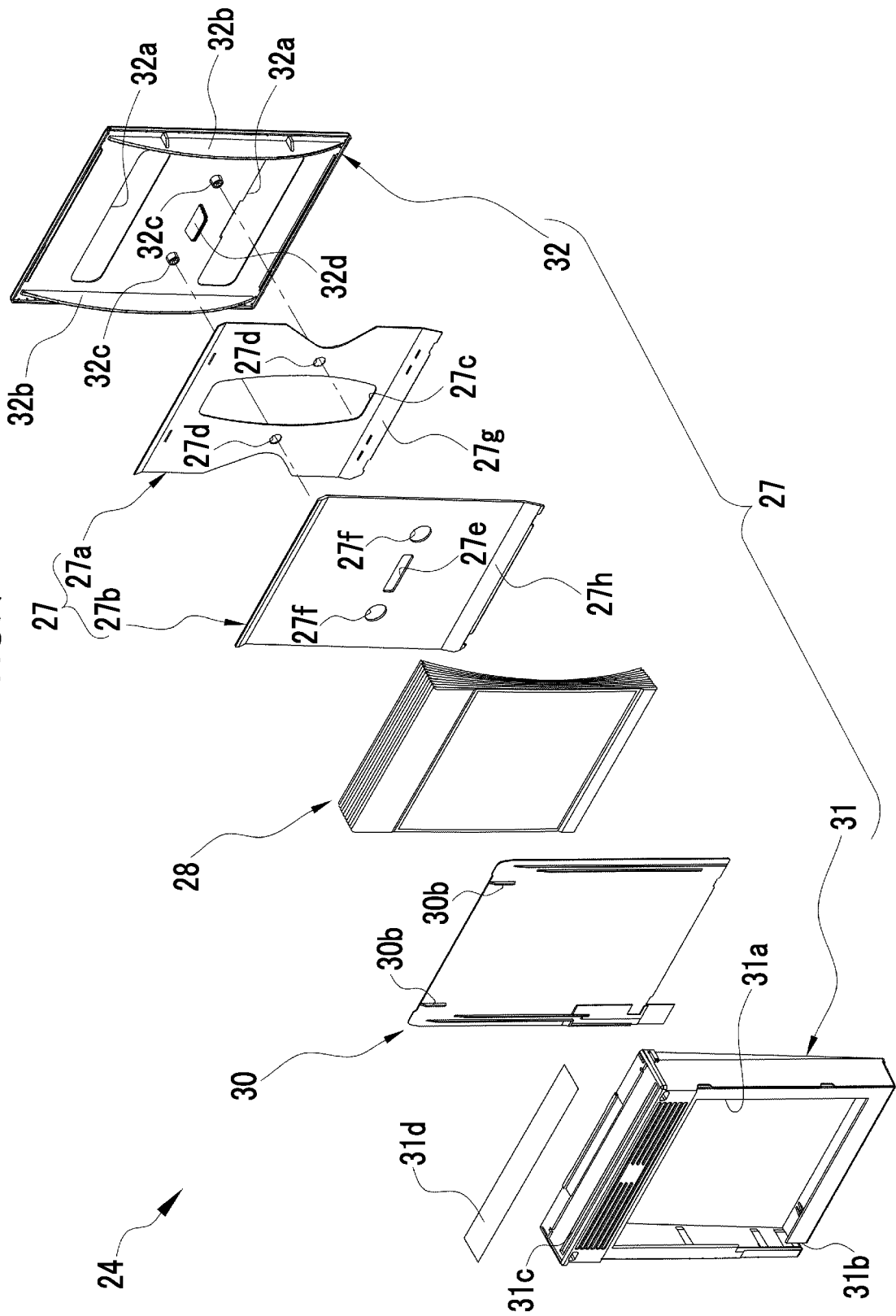
FIG. 7 is an exploded perspective view of the first instant film pack.

As shown in FIG. 7, an exposure opening 31a for exposing the instant film 28 is formed in the case member 31. In the following description, surfaces of the instant film packs 24 and 25 in which the exposure opening 31a is formed are "front surface", surfaces opposite to the "front surface" are "rear surfaces", surfaces facing the film discharge port 21 of the camera body 11 are "top surfaces", and surfaces opposite to the "top surface" are "bottom surfaces". The film cover 30 is overlapped before the instant film 28 positioned in a foremost layer initially set in the exposure opening 31a within the case member 31. Accordingly, the exposure opening 31a is lighttightly blocked by the film cover 30. A cut-off portion 31b into which a known claw member 57 (see FIGS. 14 and 15) formed at the camera is inserted is formed in a lower portion of the exposure opening 31a.

A discharge port 31c is formed on a top surface of the case member 31. The discharge port 31c is formed in a slit shape. The instant films 28 or the film cover 30 are sent out one by one outwards from the instant film pack 24 by the claw member 57 inserted into the cut-off portion 31b of the case member 31 through the discharge port 31c.

A light shielding seal 31d is pasted onto the case member 31 so as to close the discharge port 31c from the outside. The light shielding seal 31d is formed as a flexible sheet. The light shielding seal 31d is pasted onto only one edge of a long side of the discharge port 31c so as not to hinder the instant film 28 or the film cover 30 when the instant film or the film cover passes through the discharge port 31c.

As shown in FIG. 7, the cover 32 includes a pair of openings 32a, a pair of unit support protrusions 32b, a pair of caulking pins 32c, and a support piece 32d. The pair of openings 32a are formed so as to be vertically spaced apart from each other by a predetermined interval, and serve as an entrance into which the film holding portions 22a provided in the digital camera 10 with a printer are inserted when the digital camera 10 including a printer is loaded.

The pair of unit support protrusions 32b are provided at both side edge portions of the cover 32 so as to be vertically long, and each has an arc shape of which a center portion protrudes toward the exposure opening 31a. The unit support protrusions 32b touch both side edge portions on a rear surface of the instant film 28 positioned in a last layer, and push up the instant film 28 by each having the arc shape of which the center portion protrudes toward the exposure opening 31a. Accordingly, a gap between the film cover 30 and the exposure opening 31a is prevented from being formed.

The pair of caulking pins 32c are used for attaching the film press plate 27. The support piece 32d supports a center portion of the instant film 28 positioned in the last layer from behind, and prevents the instant film 28 from being curved in a direction in which the center portion is curved toward the cover 32.

The film press plate 27 includes two elastic sheets 27a and 27b made of a synthetic resin. The sheet 27a is pressed by the pair of film holding portions 22a when the loading cover 22 is closed, and is curved so as to be convex toward the cover 32. An opening 27c and a pair of holes 27d are formed in the sheet 27a. The opening 27c is formed in a center portion of the sheet 27a so as to be vertically long, and the support piece 32d is inserted into this opening. The pair of caulking pins 32c are inserted into the pair of holes 27d, and the pair of holes are used for attaching the film press plate 27 to the cover 32.

An opening 27e and a pair of holes 27f are formed in the sheet 27b. The opening 27e is formed in a center portion of the sheet 27a, and the support piece 32d is inserted into this opening. The pair of caulking pins 32c are inserted into the pair of holes 27f. A lower end portion 27h of the sheet 27b is attached to a lower end portion 27g of the sheet 27a. Accordingly, the sheet 27b prevents the sheet 27a from being slack, and prevents light leak from the pair of openings 32a. The sheet pushes up the instant film 28 in a substantially planar manner when the sheet 27a is elastically bent by the pair of film holding portions 22a. As a result, the film cover 30 positioned in the foremost layer or the instant film 28 is pressed to the back side of the front surface of the case member 31.

[Configuration of L-shaped Protrusions]

L-shaped protrusions 24c are provided on both side surfaces 24a and 24b of the instant film pack 24. The protrusions 24c are protrusions provided to prevent the instant film pack 24 from being reversely loaded.

[Configuration of First Instant Film]

Figure 8:
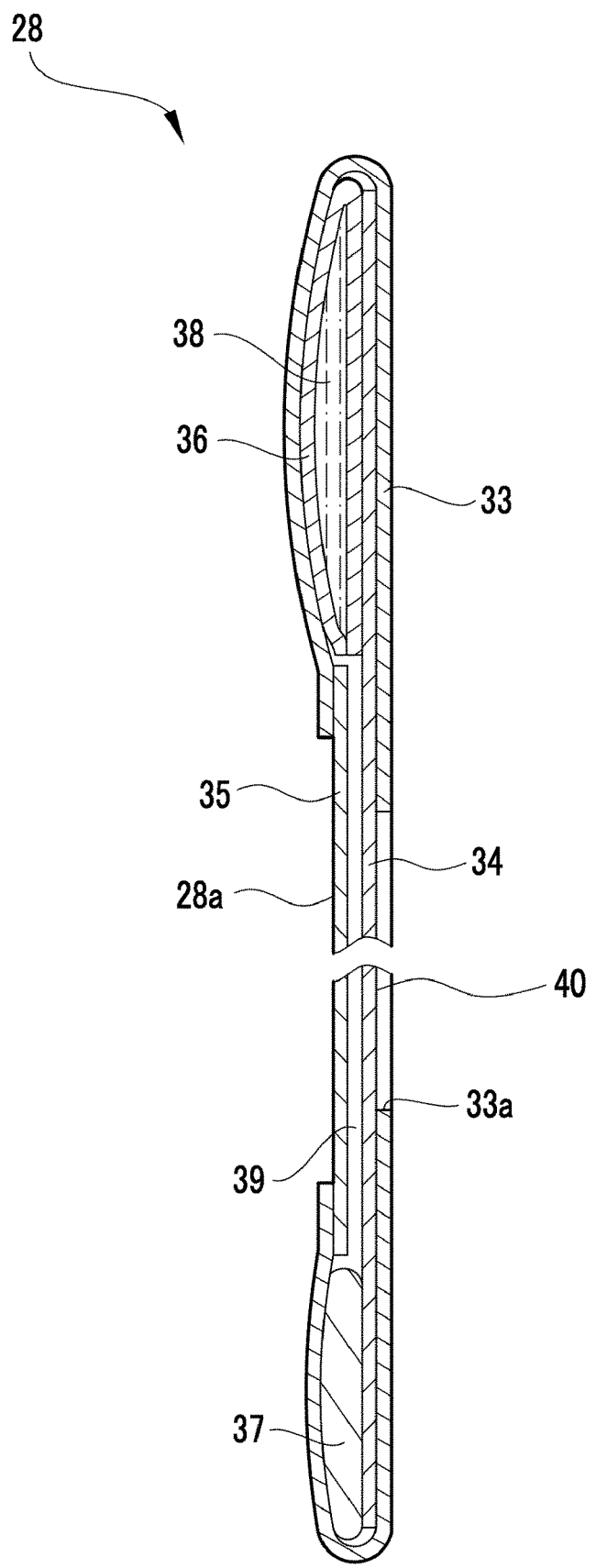
FIG. 8 is a cross-sectional view of a first instant film.

As shown in FIG. 8, the instant film 28 includes a mask sheet 33, a photosensitive sheet 34, a cover sheet 35, a developer pod 36, and a trap portion 37, and is a so-called mono-sheet type film. The mask sheet 33 is formed as a sheet made of a thin synthetic resin, and includes a screen opening 33a. A photosensitive layer, a diffusion reflective layer, an image reception layer, and the like are provided in the photosensitive sheet 34. The cover sheet 35 includes an exposure surface 28a facing an exposure head 51 to be described below.

The developer pod 36 is formed in a substantially bag shape, and contains developer 38 therein. The developer pod 36 is pasted onto an end portion of the photosensitive sheet 34 close to the discharge port 31c, and is wrapped by an end portion of the mask sheet 33. In the width direction X of the instant film 28, both ends of the developer pod 36 are spaced apart from both ends of the instant film 28 by a predetermined interval.

Figure 9:
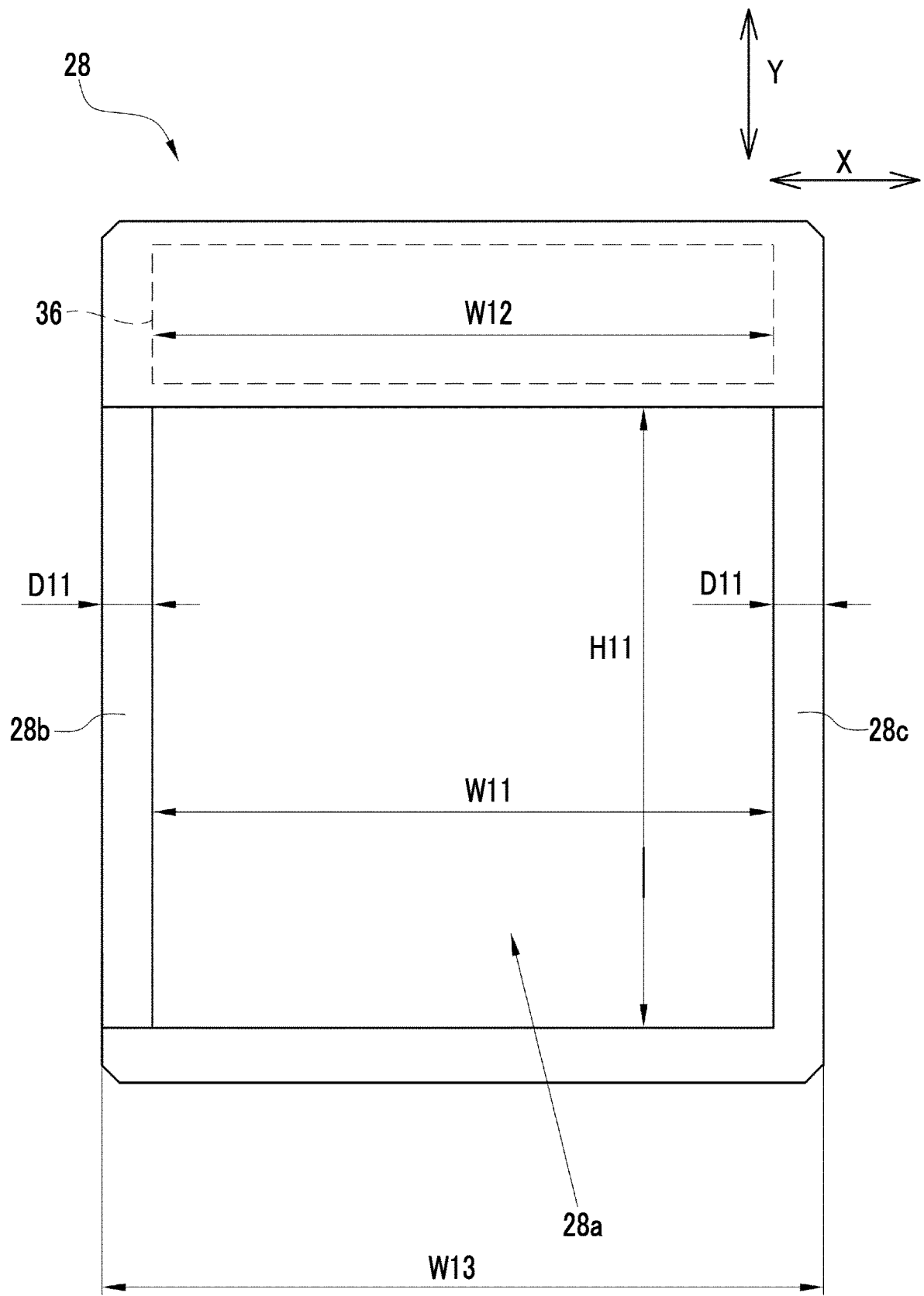
FIG. 9 is a front view of the first instant film.

As shown in FIG. 9, a dimension W12 of the developer pod 36 in the width direction X is equal to a dimension W11 of the exposure surface 28a in the width direction X. A case where the dimensions in the width direction X are equal to each other includes a case where the dimensions in the width direction are substantially equal to each other. Of the instant film 28, in the width direction X of the exposure surface 28a, portions outside both ends of the exposure surface 28a and the developer pod 36 are side edge portions 28b and 28c. As shown in FIG. 8, the trap portion 37 is pasted onto an end portion of the photosensitive sheet 34 opposite to the discharge port 31c, and is similarly wrapped by the end portion of the mask sheet 33. In the case of the example shown in FIG. 9, for example, the dimension W11 of the exposure surface 28a in the width direction X is 62 mm, the dimension H11 in a transport direction Y orthogonal to the width direction X is also 62 mm, and dimensions D11 of the side edge portions 28b and 28c in the width direction X are 5 mm. In this case, a dimension W13 of the instant film 28 in the width direction X is 72 mm.

As will be described in detail later, the photosensitive layer of the instant film 28 is irradiated with a print light at the time of printing, and thus, the photosensitive layer is exposed. The developer pod 36 is torn at the time of development, and the developer 38 flows and is spread into a gap 39 between the photosensitive sheet 34 and the cover sheet 35. An image acquired through the exposure of the photosensitive layer is reversed by the diffusion reflective layer, and is transferred to the image reception layer. By doing this, a positive image appears on a positive image observation surface 40 of the photosensitive sheet 34 exposed through the screen opening 33a.

The film cover 30 is formed as a sheet thinner than the instant film 28, and has light shielding properties and flexibility. The film cover 30 is a molded item made of a synthetic resin, and is made, for example, of polystyrene containing carbon black. That is, the film cover 30 has rigidity higher than the instant film 28. In a case where the instant film pack 24 is loaded into the film pack room 23 and is used, the film cover 30 is discharged to the film discharge port 21 by a spreading roller pair 54 (see FIG. 17) to be described later.

[Configuration of Reversal Loading Prevention Protrusion and Positioning Ribs]

Figure 10:
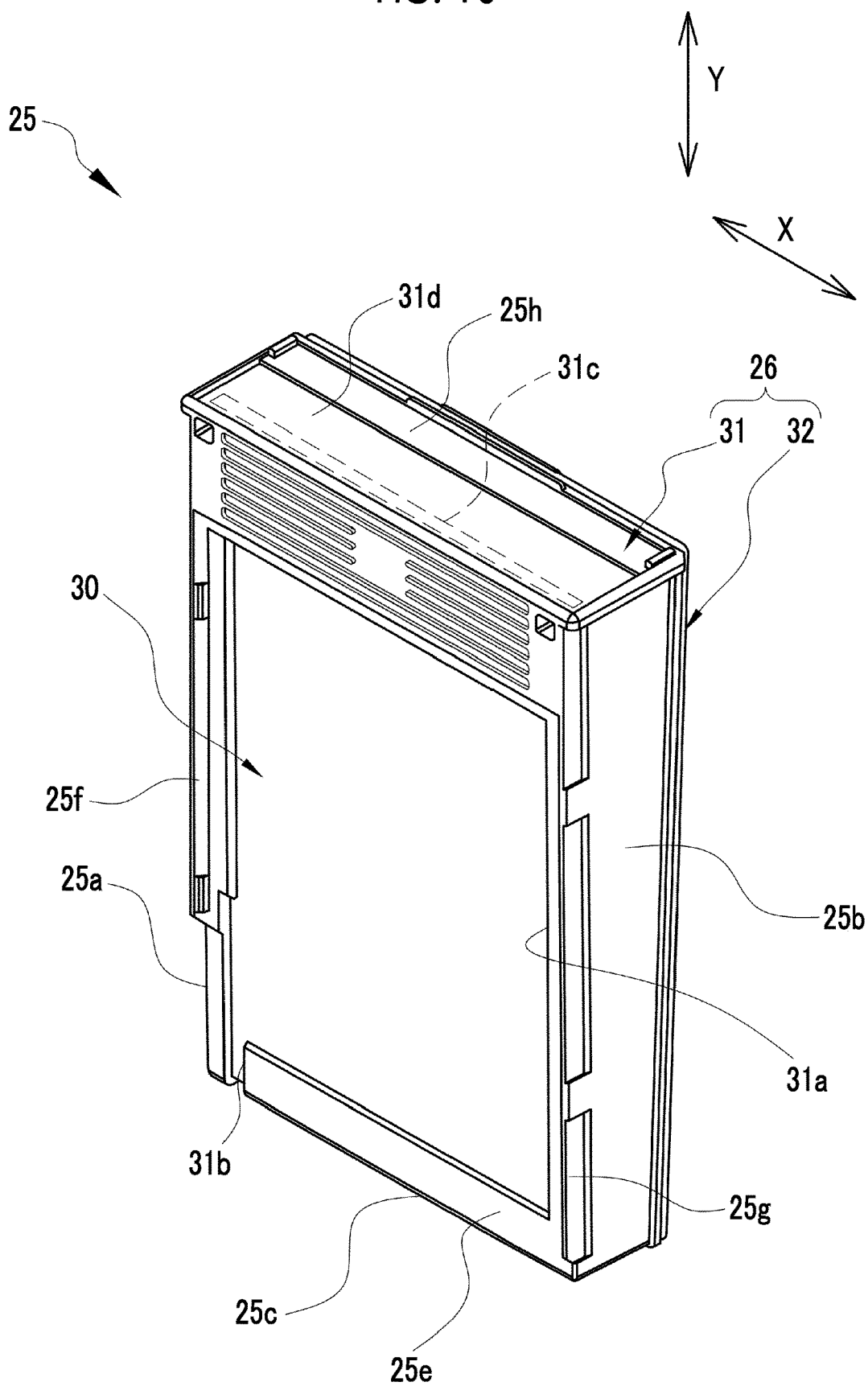
FIG. 10 is a perspective view of a second instant film pack.

As shown in FIG. 10, although the instant film pack 25 has the same basic configuration as the instant film pack 24, since the types of the instant films 28 and 29 to be accommodated are different, sizes thereof and locations at which the reversal loading prevention and the positioning are performed are different. Hereinafter, parts having the same functions as the parts of the instant film pack 24 are given by the same references and the description thereof will be omitted.

The instant film pack 25 includes a case 26, a film press plate 27, a plurality of instant films 29, and a film cover 30. As described above, the case 26, the film press plate 27, and the film cover 30 in the instant film pack 25 have sizes that match the instant film 29.

Similar to the instant film pack 24, the discharge port 31c is formed on a top surface of a case member 31. A light shielding seal 31d is pasted onto the case member so as to close the discharge port 31c from the outside. The instant films 29 or the film cover 30 are sent out one by one outwards from the instant film pack 25 by the claw member 57 inserted into the cut-off portion 31b of the case member 31 through the discharge port 31c.

Figure 11:
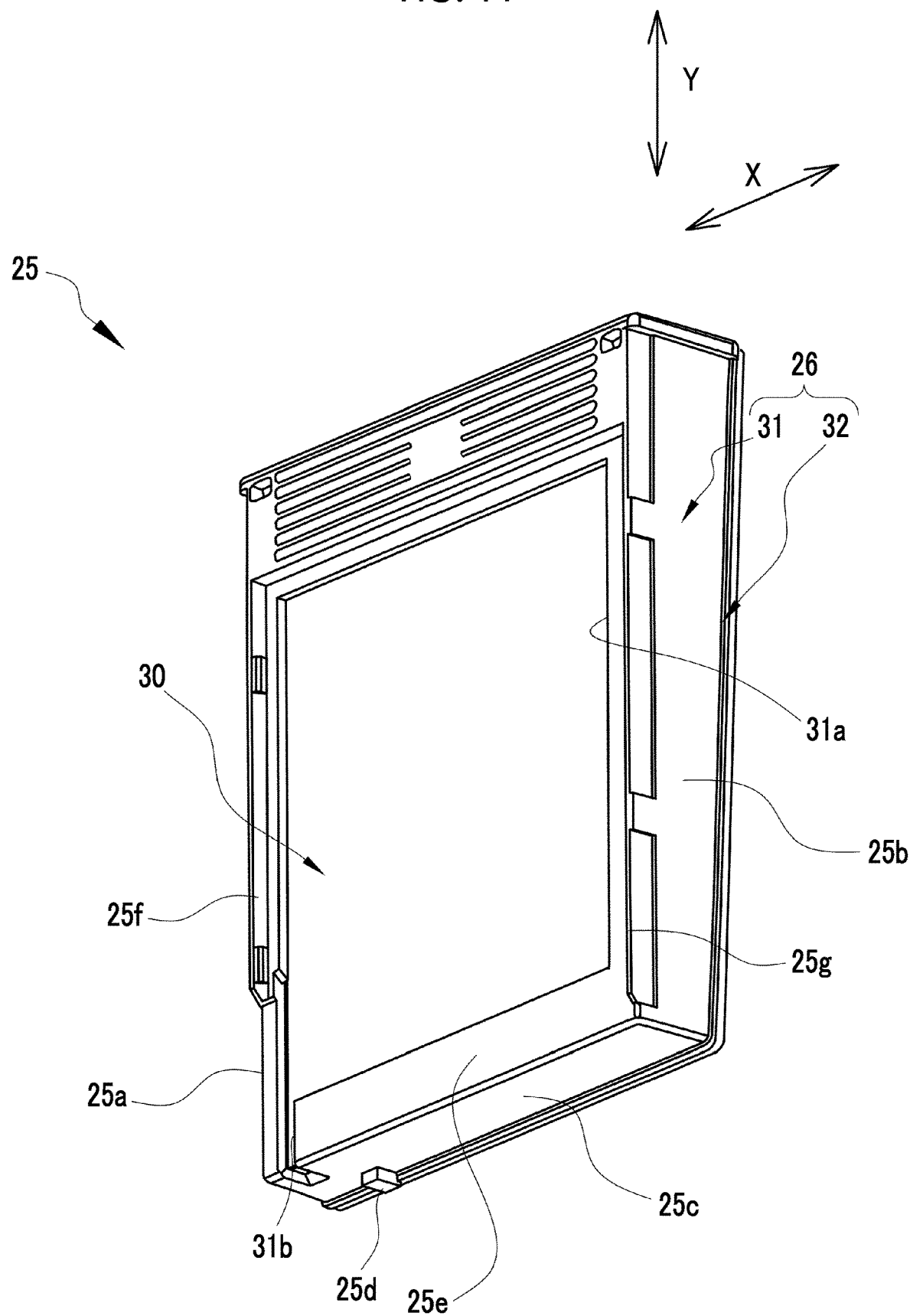
FIG. 11 is a perspective view of the second instant film pack as viewed from a bottom surface side.
Figure 12:
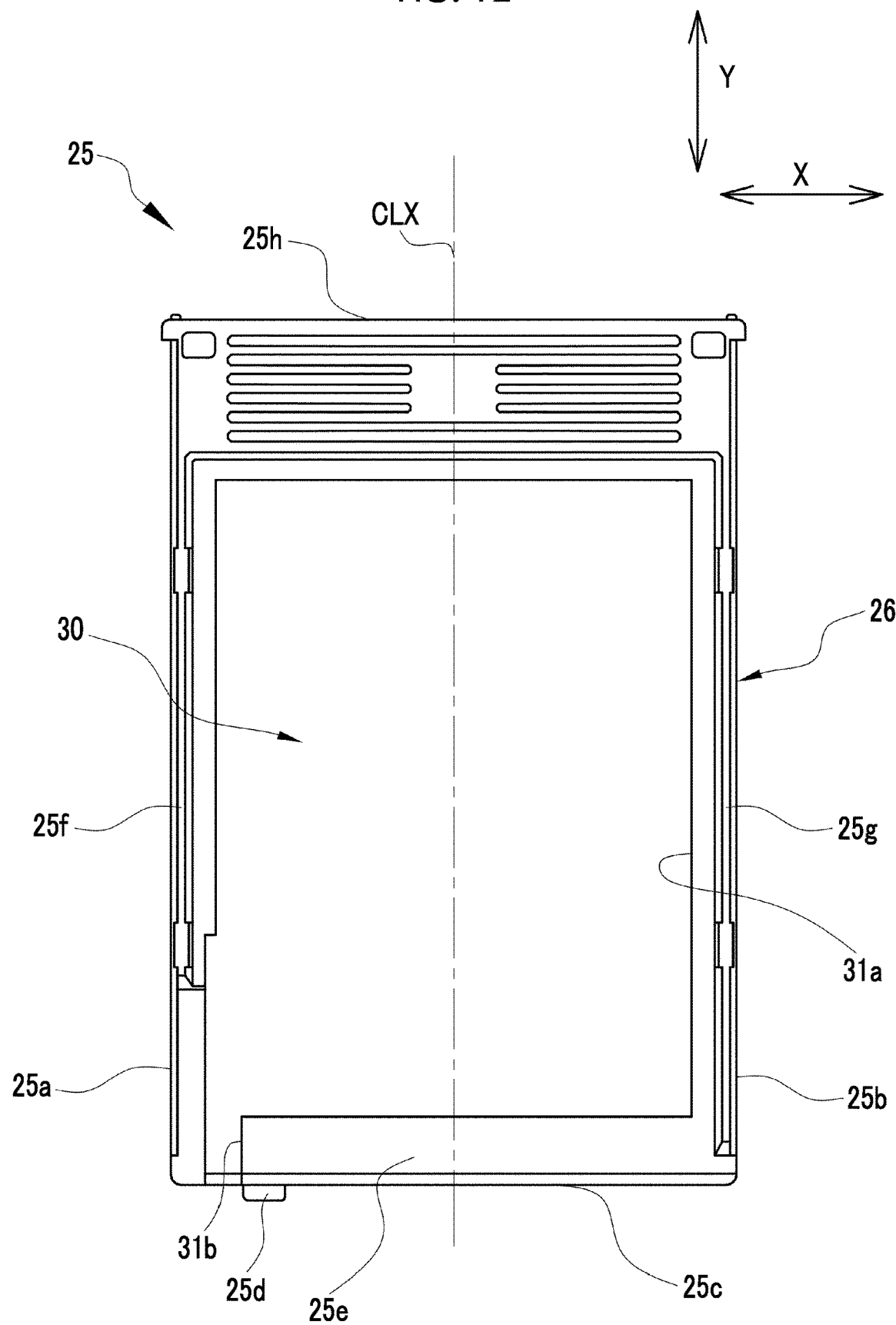
FIG. 12 is a front view of the second instant film pack.

As shown in FIGS. 11 and 12, the L-shaped protrusions 24c present in the instant film pack 24 are not provided on both side surfaces 25a and 25b of the instant film pack 25. Instead, a reversal loading prevention protrusion 25d is provided on a bottom surface 25c of the instant film pack 25. The protrusion 25d is disposed at a position near one side surface 25a of the instant film pack 25 with respect to a center line CLX (see FIG. 12) of the instant film pack 25 in the width direction X.

The protrusion 25d is integrally formed with the case 26 of the instant film pack 25. The protrusion 25d is formed in a cuboid shape protruding from the bottom surface 25c of the instant film pack 25.

A pair of ribs 25f and 25g are provided on a front surface 25e of the instant film pack 25. The ribs 25f and 25g are positioned on both sides of the exposure opening 31a, and protrude forward in parallel with the transport direction Y of the instant film pack 25 and along the side surfaces 25a and 25b of the instant film pack 25. Since one rib 25f is adjacent to the cut-off portion 31b into which the claw member 57 (see FIGS. 14 and 15) is inserted, a lower end portion is cut off so as not to interfere with the claw member 57. Accordingly, the dimension in the transport direction Y is formed shorter than the dimension of the other rib 25g.

[Configuration of Second Instant Film]

Figure 13:
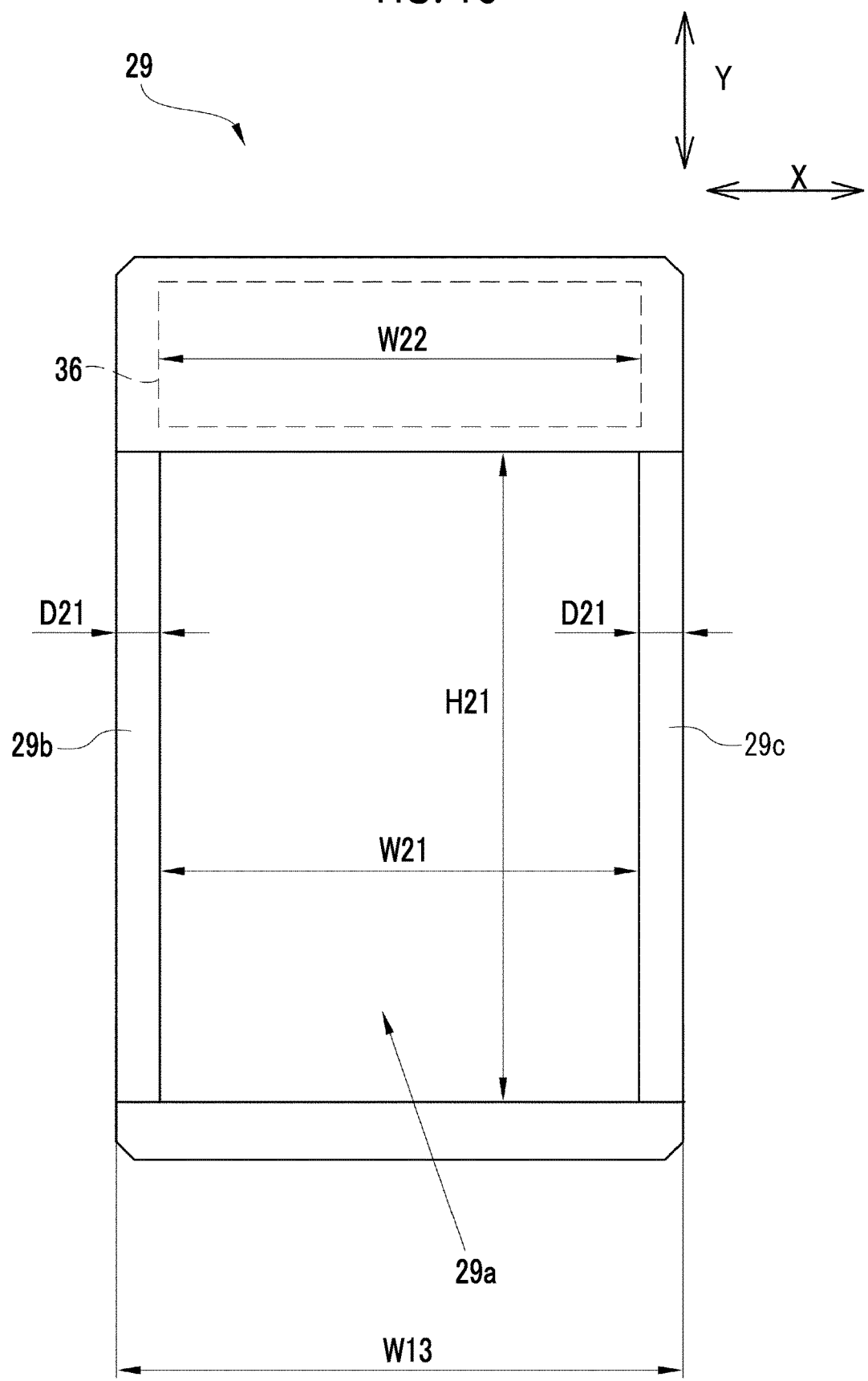
FIG. 13 is a front view of a second instant film.

As shown in FIG. 13, the instant film 29 is a mono-sheet type film similar to the instant film 28 except for the difference in size. Similar to the instant film 28, the instant film 29 includes a mask sheet 33, a photosensitive sheet 34, a cover sheet 35, a developer pod 36, a trap portion 37, and the like. Hereinafter, parts having the same functions as the parts of the instant film 28 are given by the same references and the description thereof will be omitted.

Of the instant film 29, in the width direction X of the instant film 29, portions outside both ends of an exposure surface 29a and the developer pod 36 are side edge portions 29b and 29c. In the instant film 29, a dimension W22 of the developer pod 36 in the width direction X is equal to a dimension W21 of the exposure surface 29a in the width direction X. A case where the dimensions in the width direction X are equal to each other includes a case where the dimensions in the width direction are substantially equal to each other. In the case of the example shown in FIG. 13, for example, the dimension W21 of the exposure surface 29a in the width direction X is 46 mm, a dimension H21 in the transport direction Y orthogonal to the width direction X is 62 mm, and dimensions D21 of the side edge portions 29b and 29c in the width direction X are 4 mm. In this case, a dimension W23 of the instant film 29 in the width direction X is 54 mm. That is, all the dimensions of the portions of the instant film 29 in the width direction are smaller than the dimensions of the portions of the instant film 28.

[Configuration of Printer Unit]

Figure 14:
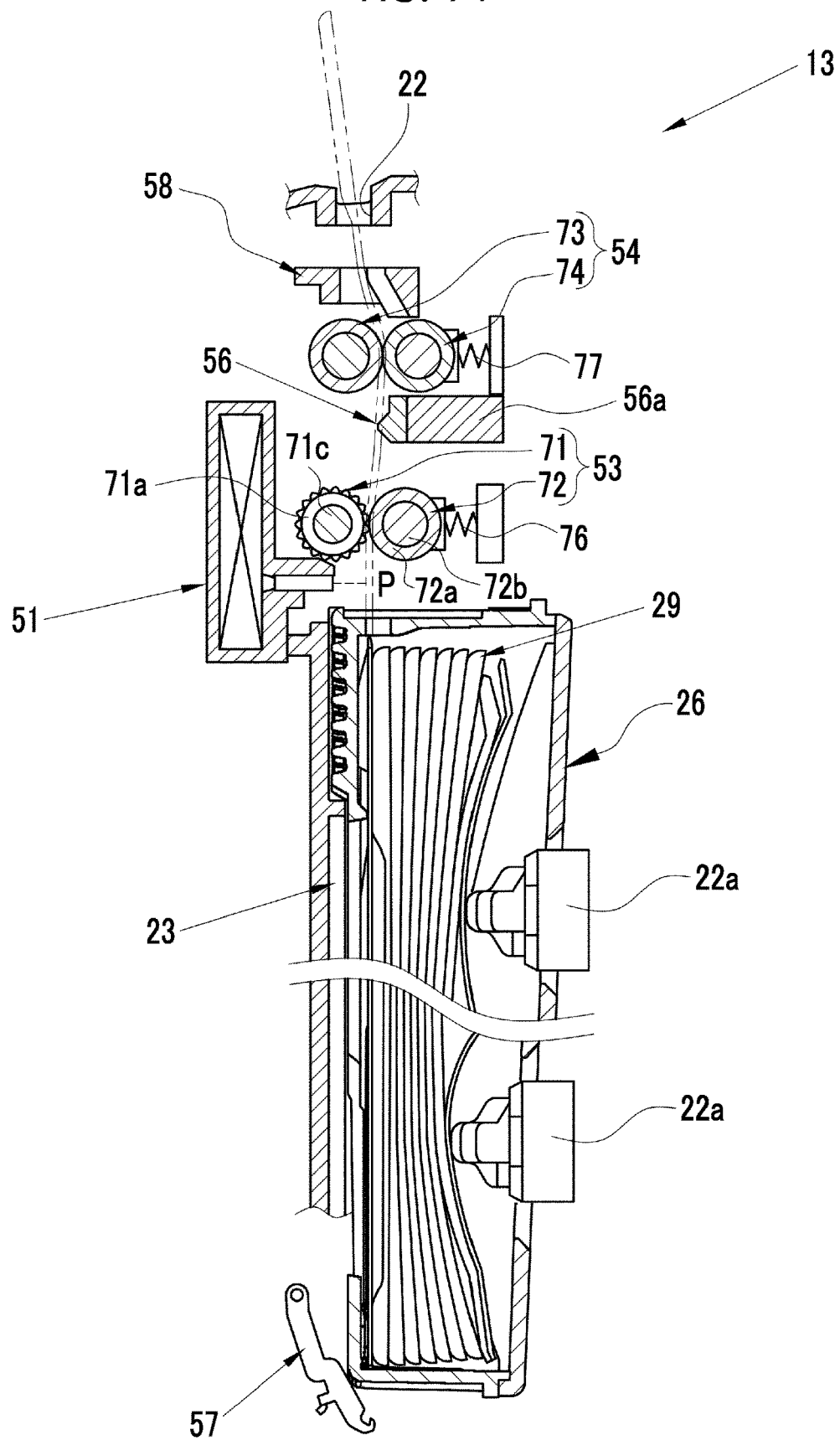
FIG. 14 is a cross-sectional view of a printer unit.
Figure 15:
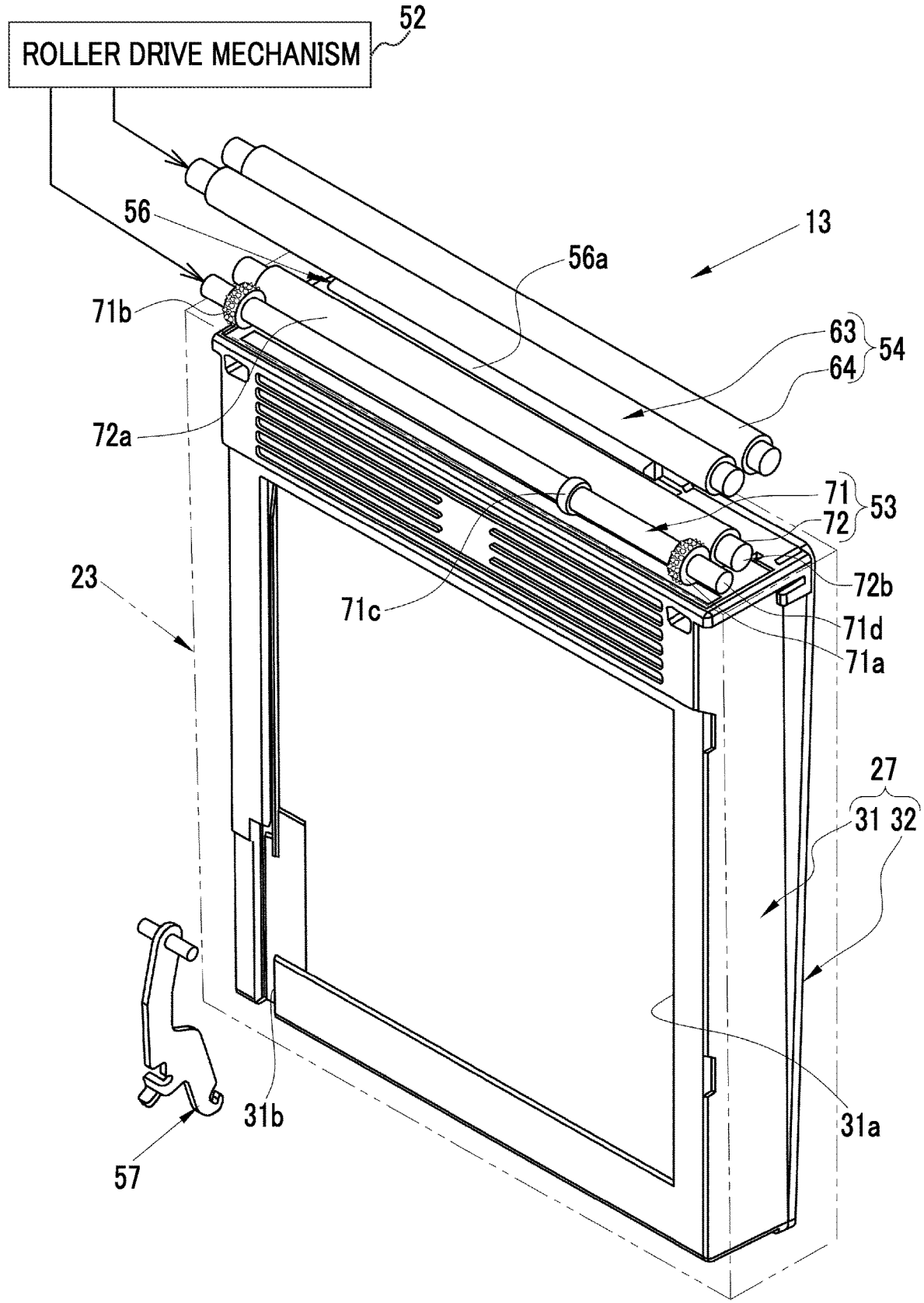
FIG. 15 is a perspective view of the printer unit.

As shown in FIGS. 14 and 15, the printer unit 13 includes the exposure head 51, a roller drive mechanism 52, a transport roller pair 53, the spreading roller pair 54, a spreading control member 56, the film pack room 23 (see FIGS. 16 and 17), the claw member 57, a claw member drive mechanism (not shown), and an ejection guide 58.

[Configuration of First Positioning Unit and Second Positioning Unit of Film Pack Room]

Figure 16:
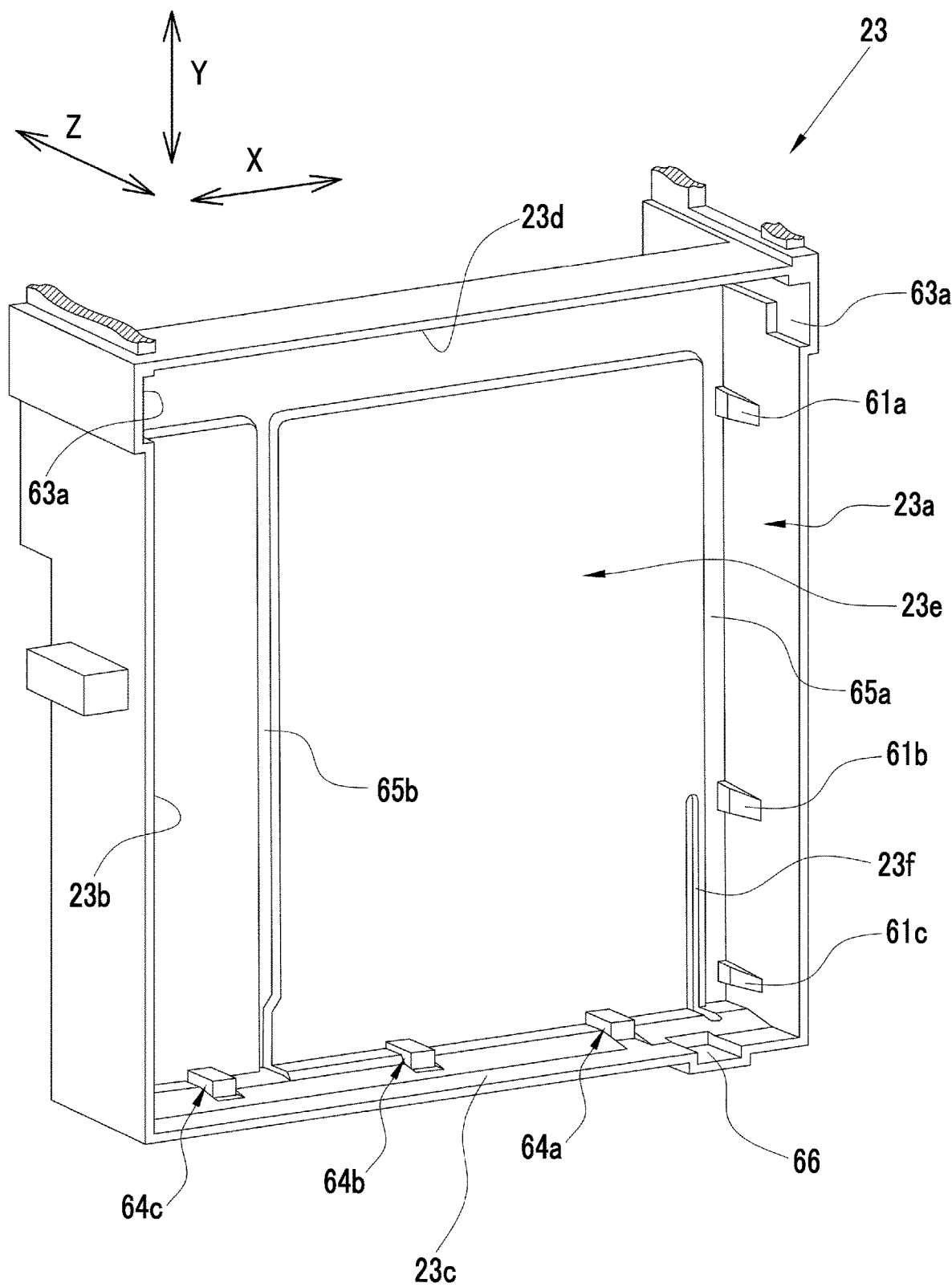
FIG. 16 is a perspective view of a film pack room.
Figure 17:
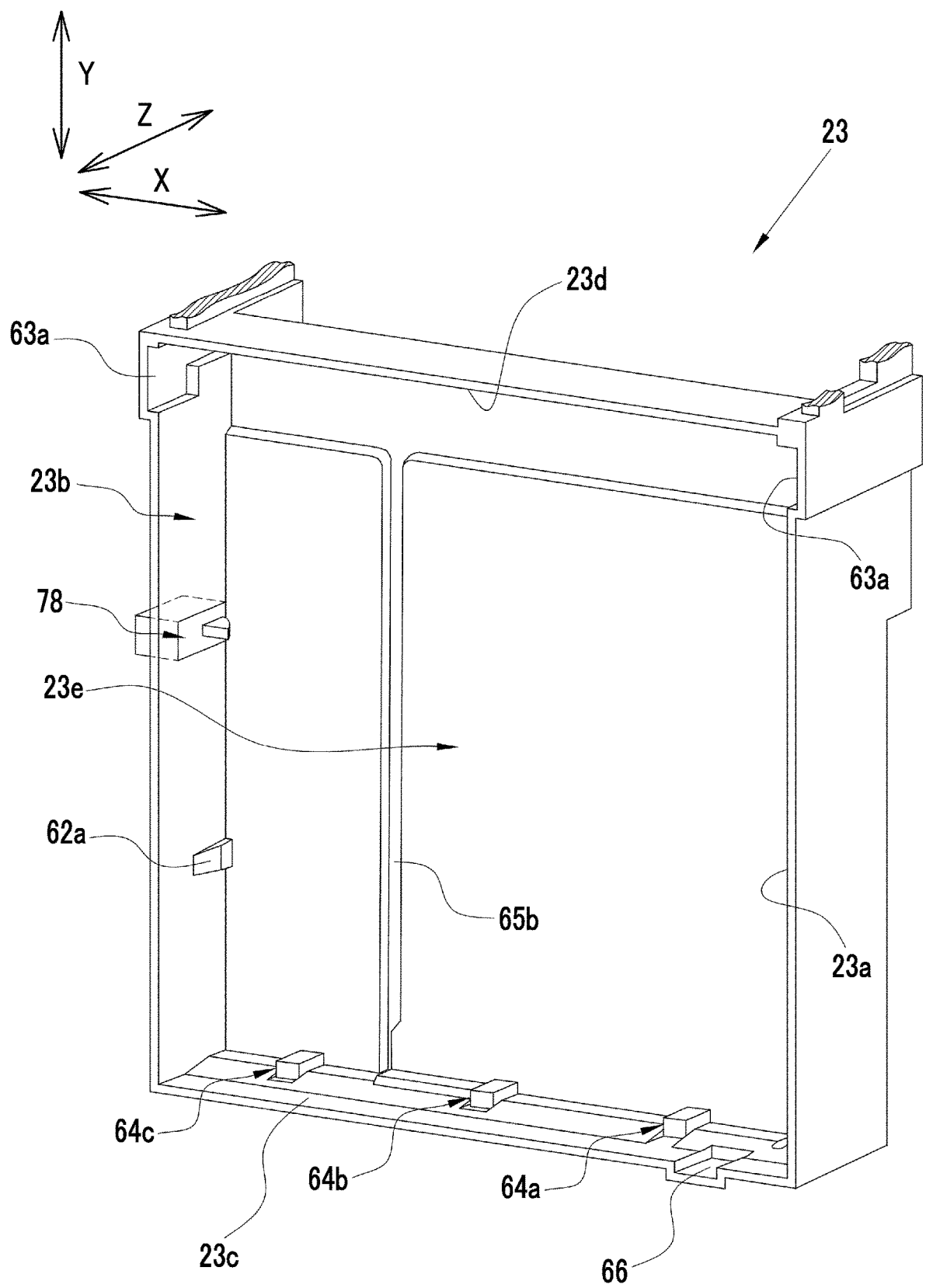
FIG. 17 is a perspective view of the film pack room viewed from another angle.

As shown in FIGS. 16 and 17, the film pack room 23 is formed in a box shape in which the rear surface side of the camera body 11 is opened. Positioning protrusions 61a to 61c and 62a for aligning the instant film pack 24 in the width direction X are provided in the film pack room 23. The positioning protrusions 61a to 61c and 62a correspond to a first positioning unit in the claims.

The positioning protrusions 61a to 61c are provided on a right side surface 23a of the film pack room 23, and the positioning protrusions 62a is provided on a left side surface 23b of the film pack room 23. The positioning protrusions 61a to 61c and 62a are formed in a wedge shape in which a thickness gradually increases along a loading direction Z of the instant film pack 24, that is, a front-rear direction of the camera body 11.

L-shaped cut-off portions 63a are formed on both side surfaces 23a and 23b of the film pack room 23. The L-shaped cut-off portions 63a prevent the instant film pack 24 from being reversely loaded by being fitted with the L-shaped protrusions 24c provided on both the side surfaces 24a and 24b of the instant film pack 24.

Figure 18:
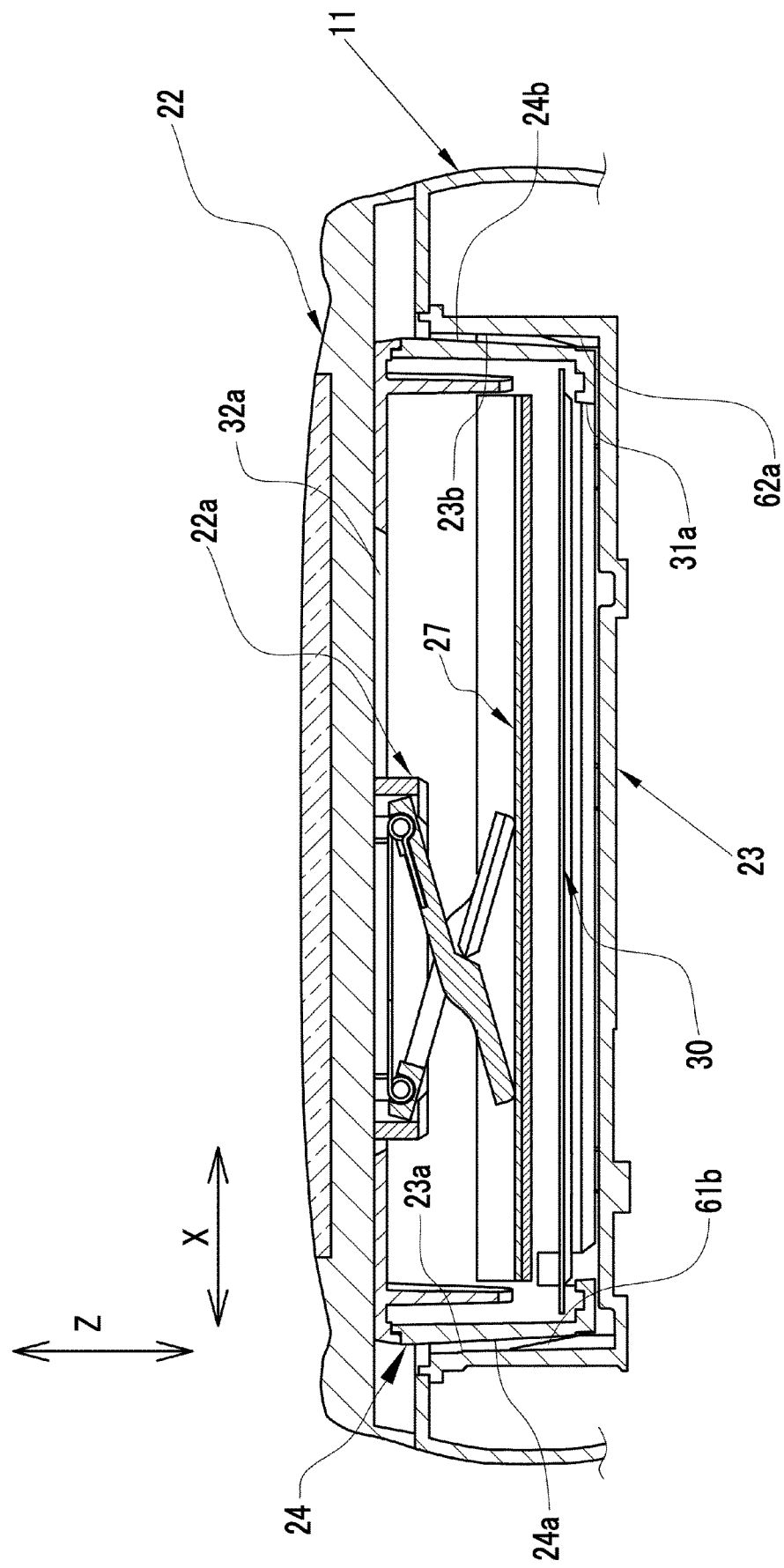
FIG. 18 is a traversal cross-sectional view of the digital camera including a printer into which the first instant film pack is loaded.
Figure 19:
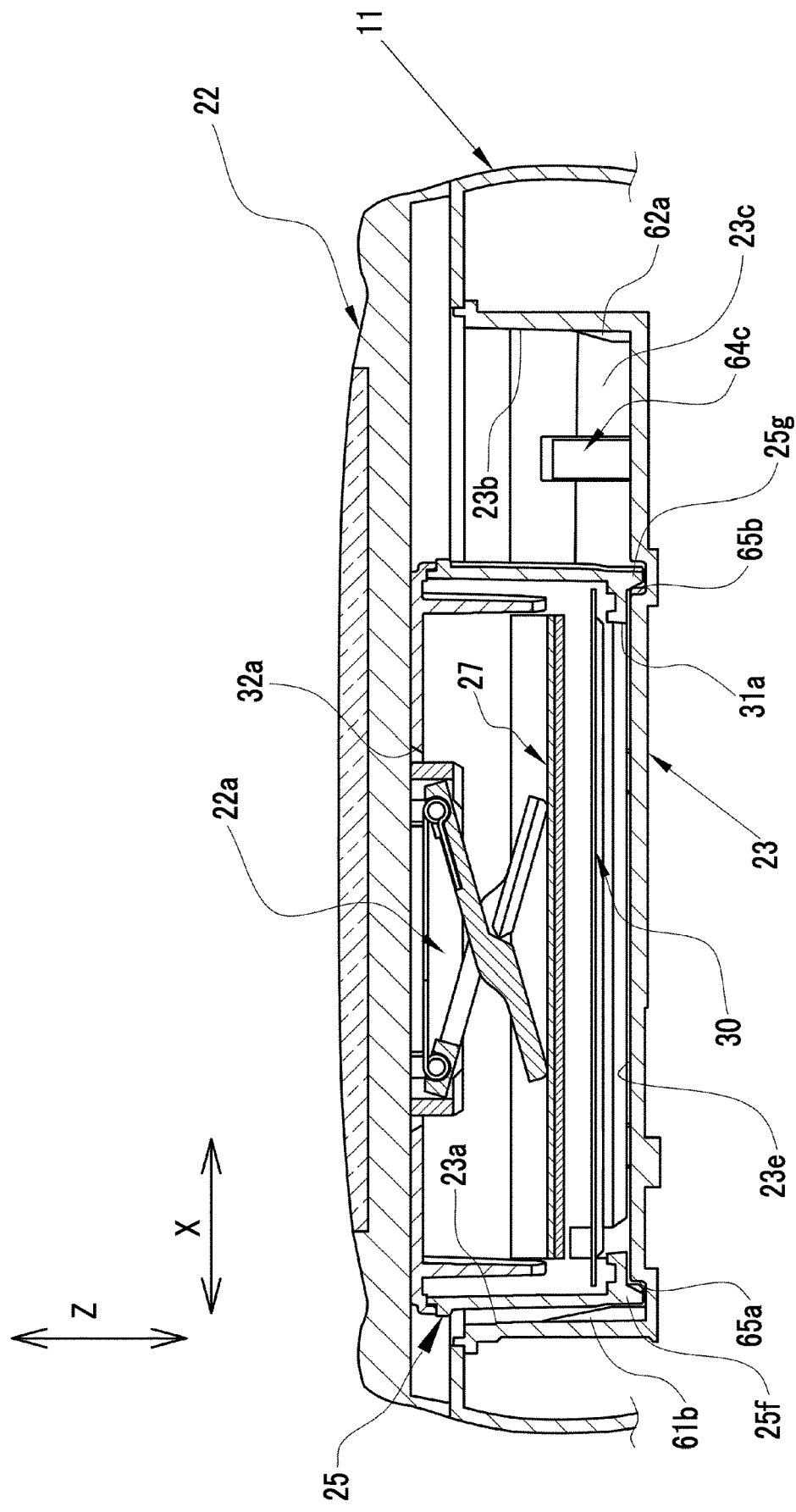
FIG. 19 is a traversal cross-sectional view of the digital camera including a printer into which the second instant film pack is loaded.

As shown in FIG. 18, a dimension of the instant film pack 24 in the width direction X is formed to be larger than a dimension of the instant film pack 25 in the width direction. Thus, positioning in the width direction X can be performed by bringing both the side surfaces 24a and 24b of the instant film pack 24 into contact with the positioning protrusions 61a to 61c and 62a. In FIGS. 18 and 19, in order to prevent the drawings from becoming complicated, the stacked instant films 28 and 29 are not shown.

Since the positioning protrusions 61a to 61c and 62a are formed in the wedge shape, in a case where the instant film pack 24 is pushed into the film pack room 23 in the loading direction, both the side surfaces 24a and 24b of the instant film pack 24 securely touch the positioning protrusions 61a to 61c and 62a. Since the instant film pack 25 is aligned by another positioning unit to be described later, the positioning protrusions 61a to 61c and 62a are not used.

Elastic members 64a to 64c (see FIGS. 16 and 17) for aligning the instant film packs 24 and 25 in the transport direction Y are provided on a bottom surface 23c of the film pack room 23. The elastic members 64a to 64c are cuboid members made of sponge or rubber, and are arranged at predetermined intervals along the width direction X. In a case where both the side surfaces 24a and 24b of the instant film pack 24 touch the positioning protrusions 61a to 61c and 62a and the L-shaped protrusions 24c are fitted into the L-shaped cut-off portions 63a, the bottom surface 24d of the instant film pack 24 simultaneously touches the elastic members 64a to 64c. The elastic members 64a to 64c that touch the bottom surface 24d of the instant film pack 24 are in a compressed state. Accordingly, an elastic force in a case where the elastic members 64a to 64c try to return from the compressed state to the state before compression acts, and a top surface 24e of the instant film pack 24 is pressed against a top surface 23d of the film pack room 23. The top surface 23d of the film pack room 23 has an opening portion connected to the transport roller pair 53.

On the other hand, the positioning grooves 65a and 65b for aligning the instant film pack 25 in the width direction X are provided in the film pack room 23. The positioning grooves 65a and 65b correspond to a second positioning unit in the claims.

The positioning grooves 65a and 65b are formed on a front surface 23e of the film pack room 23 (a surface facing the exposure openings 31a of the instant film packs 24 and 25). The positioning groove 65a is disposed at a position near the right side surface 23a of the film pack room 23. The positioning groove 65b is disposed at a position spaced apart from the positioning groove 65a at a predetermined interval. A width and an interval between the positioning grooves 65a and 65b match a width and an interval between the ribs 25f and 25g of the instant film pack 25.

The film pack room 23 includes a cut-off portion 23f (see FIG. 16). The cut-off portion 23f is formed at a position facing the cut-off portions 31b of the instant film packs 24 and 25, and is continuous with the bottom surface of the film pack room 23. The claw member 57 enters the inside of the instant film packs 24 and 25 through the cut-off portion 23f, and the instant films 28 and 29 are discharged one by one outwards from the instant film packs 24 and 25.

The cut-off portion 23f is disposed at a position of the film pack room 23 closer to the right side surface 23a than the center. Thus, the cut-off portions 31b of the instant film packs 24 and 25 loaded into the film pack room 23 are also formed at positions close to the one side surfaces 24a and 25a of the instant film packs 24 and 25.

As shown in FIG. 19, the instant film pack 25 is formed to have a smaller dimension in the width direction X than the instant film pack 24. Thus, the positioning in the width direction X can be performed by fitting the ribs 25f and 25g into the positioning grooves 65a and 65b (second positioning unit) positioned inside the film pack room 23 with respect to the positioning protrusions 61a to 61c and 62a (first positioning unit).

A reversal loading prevention cut-off portion 66 is formed on the bottom surface 23c of the film pack room 23. The reversal loading prevention cut-off portion 66 prevents the instant film pack 25 from being reversely loaded by being fitted into the cuboid-shaped protrusion 25d provided on the bottom surface 25c of the instant film pack 25.

In a case where the ribs 25f and 25g of the instant film pack 25 and the positioning grooves 65a and 65b are fitted and the protrusion 25d and the reversal loading prevention cut-off portion 66 are fitted, the bottom surface 25c of the instant film pack 25 simultaneously touches the elastic members 64a and 64b. Since the instant film pack 25 has a smaller dimension in the width direction than the instant film pack 24, the bottom surface 25c does not touch the elastic member 64c. Accordingly, the elastic force acts from the elastic members 64a and 64b, and a top surface 25h of the instant film pack 25 is pressed against the top surface 23d of the film pack room 23.

As described above, the instant film packs 24 and 25 are aligned with respect to the film pack room 23 in the width direction X and the transport direction Y, and the positioning in the loading direction Z is performed by closing the loading cover 22. Specifically, the pair of film holding portions 22a provided at the loading cover 22 align the instant film packs 24 and 25 in the loading direction Z.

That is, in a case where one of the instant film packs 24 and 25 is loaded into the film pack room 23 and the loading cover 22 is positioned in the closed position, the pair of film holding portions 22a pass through the openings 32a, are inserted into the instant film packs 24 and 25, and press the film press plate 27. Accordingly, the instant films 28 and 29 in the instant film packs 24 and 25 are pressed in a stacking direction.

Figure 20:
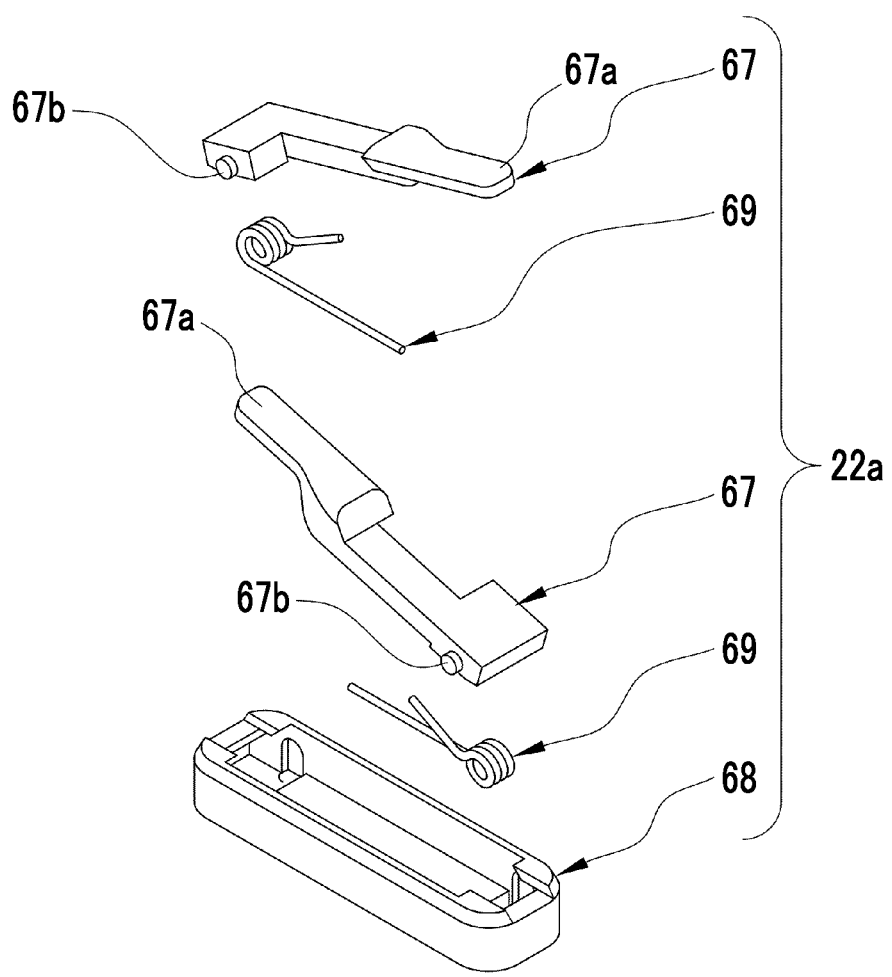
FIG. 20 is an exploded perspective view of film holding portions.

As shown in FIG. 20, the film holding portion 22a includes a pair of press members 67, a holding frame 68, and springs 69. The holding frame 68 holds the press members 67, and is fixed to an inner wall surface side of the loading cover 22.

The pair of press members 67 face each other such that positions of distal end portions 67a and rotational shafts 67b are opposite to each other, and are held by the holding frame 68. For example, the holding frame 68 is fixed to the loading cover 22 through screwing. The springs 69 are torsion coil springs, and are attached between the press members 67 and the holding frame 68. The springs 69 urge the press members 67 such that the distal end portions 67a move rotationally upward in the drawing. Accordingly, the distal end portions 67a press the film press plate 27.

As described above, since the instant film pack 25 has a smaller dimension in the width direction than the instant film pack 24 and one positioning groove 65a is disposed at a position near the right side surface 23a of the film pack room 23, the instant film pack 25 is aligned with the film pack room 23 so as to be shifted to the right side surface 23a.

The pair of film holding portions 22a are arranged at positions corresponding to the instant film pack 25, and are formed to have a small dimension in the width direction X so as to correspond to the opening 32a of the instant film pack 25. Thus, in a case where the instant film pack 25 is loaded into the film pack room 23 (state shown in FIG. 18), the film holding portions 22a enter the opening 32a so as to correspond to the positions, and the instant film 29 is pressed in the stacking direction via the film press plate 27. Accordingly, the instant film pack 25 is pressed against the front surface 23e of the film pack room 23 and is aligned in the loading direction Z.

On the other hand, the instant film pack 24 has a larger dimension in the width direction than the instant film pack 25, and the opening 32a of the instant film pack 24 is formed so as to have a larger dimension in the width direction X than the opening 32a of the instant film pack 25. The dimensions of the opening 32a of the instant film pack 24 and the opening 32a of the instant film pack 25 in the transport direction Y are substantially equal to each other. In a case where the instant film pack 24 is loaded into the film pack room 23 (state shown in FIG. 18), the film holding portions 22a are arranged at the positions corresponding to the instant film pack 25, that is, the positions shifted to one side with respect to the instant film pack 24. However, since the opening 32a of the instant film pack 24 has a long dimension in the width direction X, the film holding portions 22a enter, and the instant film 28 is pressed in the stacking direction via the film press plate 27. Accordingly, the instant film pack 24 is pressed against the front surface 23e of the film pack room 23 and is aligned in the loading direction Z.

The instant film packs 24 and 25 are loaded as described above, and the image is recorded by the printer unit 13 on the instant films 28 and 29 ejected from the instant film packs 24 and 25.

The transport roller pair 53 and the spreading roller pair 54 are driven to be rotated by the roller drive mechanism 52, and transport the film cover 30 and the instant films 28 and 29. The roller drive mechanism 52 includes, for example, a motor as a drive source and a transmission mechanism such as a gear train that transmits rotational drive. The transport roller pair 53 includes a capstan roller 71 and a pinch roller 72. The capstan roller 71 and the pinch roller 72 are arranged at positions at which these rollers pinch a transport path of the instant film 28.

The capstan roller 71 is disposed on a side (a left side of the transport path in the diagram) facing the exposure surfaces 28a and 29a of the instant films 28 and 29. The capstan roller 71 includes a pair of columnar spike roller members 71a and 71b, a sub roller member 71c, and a rotational shaft 71d that holds each spike roller member 71a and the sub roller member 71c.

A spike (not shown) including a plurality of small protrusions (convex portions) is formed on a circumferential surface of the spike roller member 71a. A holding force of the spike roller member 71a is further improved by the protrusions. The number and shape of protrusions may be appropriately designed. The protrusion includes a small convex and a small concave formed by filing the circumferential surface of the spike roller member 71a. The sub roller member 71c is formed in a smooth curved surface shape in which a cross section cut along a plane including an axial direction and a diametrical direction is convex outward.

Figure 21:
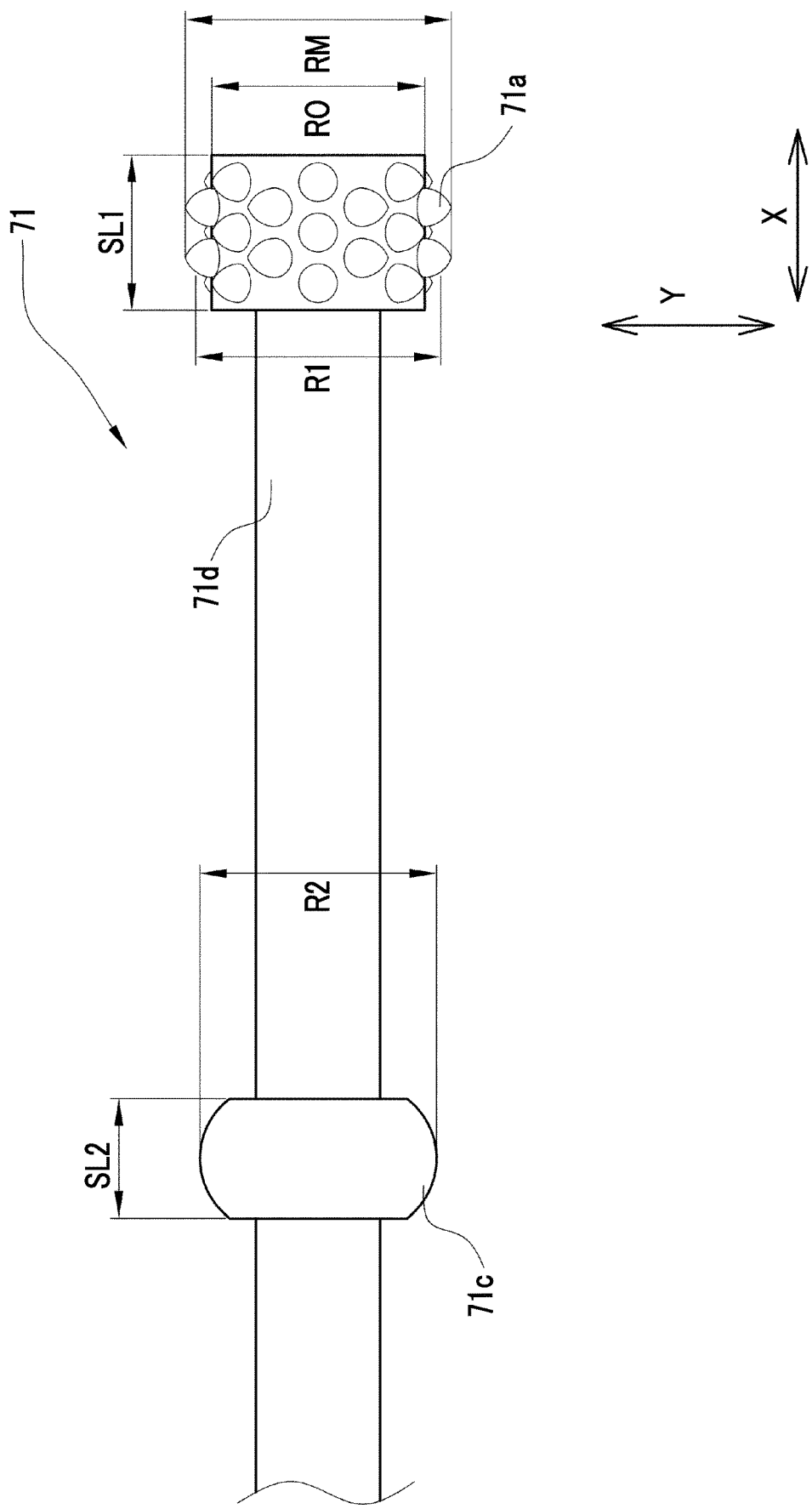
FIG. 21 is an explanatory diagram showing dimensions of a spike roller member and a sub roller member.

As shown in FIG. 21, in a case where an average value of a maximum outer diameter RM including a distal end of the convex portion of the spike roller member 71a or 71b and a minimum outer diameter RO not including the convex portion is an effective outer diameter R1 of the spike roller member 71a or 71b, it is preferable that an outer diameter R2 of the sub roller member 71c is smaller than the effective outer diameter R1 of the spike roller member 71a or 71b and is larger than the minimum outer diameter RO of the spike roller member 71a or 71b.

It is preferable that a dimension SL2 of the sub roller member 71c in the width direction X is smaller than a dimension SL1 of the spike roller member 71a or 71b in the width direction X. It is preferable that the dimension SL1 of the spike roller member 71a or 71b in the width direction X is 1.4 mm and the dimension SL2 of the sub roller member 71c in the width direction X is 1.2 mm.

As shown in FIG. 14, the pinch roller 72 is disposed on a side (a right side of the transport path in the diagram) facing the positive image observation surface 40 (see FIG. 8) of the instant film 28. The pinch roller 72 includes a roller member 72a and a rotational shaft 72b. Both end portions of the roller member 72a are supported so as to freely move by a support member (not shown) within a thickness range of the instant film 28, and are pressed toward the capstan roller 71 by springs 76 as press mechanisms. Thus, the pinch roller 72 is elastically supported in a direction orthogonal to the transport direction of the instant film 28.

The transport roller pair 53 transports the instant films 28 and 29 discharged out from the instant film packs 24 and 25 by the claw member 57 toward the spreading roller pair 54. The configuration for transporting the instant films 28 and 29 by the transport roller pair 53 will be described later. An exposure position P (see FIG. 14) at which the exposure head 51 exposes the instant films 28 and 29 to the print light is positioned between the discharge ports 31c of the instant film packs 24 and 25 and the transport roller pair 53. The exposure using the exposure head 51 is performed for a period during which the instant film is transported by the transport roller pair 53.

The exposure is performed by sequentially exposing line images on the instant films 28 and 29 by the exposure head 51 while moving the instant films 28 and 29 for each line. Accordingly, an image corresponding to a single screen is exposed on the photosensitive layer of the instant films 28 and 29. The instant films 28 and 29 are subsequently transported toward the spreading roller pair 54 by the transport roller pair 53.

Since the instant films 28 and 29 have different dimensions in the width direction X, the exposure of the line images by the exposure head 51 is also different. The exposure by the exposure head 51 is switched according to the signal of the detection switch 78 provided in the film pack room 23, as will be described later.

The spreading roller pair 54 includes spreading rollers 73 and 74, and is disposed on a downstream side of the transport roller pair 53 in the transport direction. The spreading roller 73 is disposed on a side (the left side of the transport path in the diagram) facing the exposure surfaces 28a and 29a of the instant films 28 and 29. The spreading roller 74 is disposed on a side (the right side of the transport path in the diagram) facing the image observation surfaces of the instant films 28 and 29. Both end portions of the spreading roller 74 are supported so as to freely move within the thickness range of the instant films 28 and 29 by a support member (not shown), and are pressed toward the spreading roller 73 by springs 77 as press mechanisms. Thus, the spreading roller 74 is elastically supported in a direction orthogonal to the transport direction of the instant film 28.

Although not shown, driving gears are attached to one-side shaft end portions of the spreading rollers 73 and 74, and both the driving gears mesh each other. The motor is connected to one of the driving gears through an intermediate gear. Thus, in a case where the motor rotates, the spreading rollers 73 and 74 are rotated in synchronization with the motor.

The ejection guide 58 is disposed on the downstream side of the spreading roller pair 54 in the transport direction. The spreading roller pair 54 transports the instant film 28 transported by the transport roller pair 53 toward the ejection guide 58 while sandwiching the instant film over the entire width. The instant film is sandwiched by the spreading roller pair 54, and thus, the developer pod 36 of the instant film 28 is crushed. Accordingly, the developer is spread (unfolded) into the gap 39 (see FIG. 8). The instant film 28 discharged from the spreading roller pair 54 is transported toward the ejection guide 58.

The spreading control member 56 is provided between the transport roller pair 53 and the spreading roller pair 54. The spreading control member 56 touches the positive image observation surface 40 of the transported instant film 28, and rubs the positive image observation surface 40 of the instant film 28. Thus, the spreading control member 56 that controls a distribution of developer being spread extends in a direction parallel to the width direction of the instant film 28 being transported and orthogonal to the transport direction of the instant film 28. The spreading control member 56 is formed integrally with a plate-shaped support member 56a, and is fixed to the camera body 11 through the support member 56a.

A distal end of the spreading control member 56 protrudes toward the instant film 28 from a sandwiching position at which the spreading roller pair 54 sandwiches the instant film 28 on a cross section which is orthogonal to the exposure surface 28a of the instant film 28 being transported and is in parallel with the transport direction. Accordingly, the spreading control member 56 can securely rub the positive image observation surface 40 of the instant film 28.

[Action of Positioning Unit of Film Pack Room]

In a case where the instant film pack 24 is loaded into the film pack room 23, the positioning in the width direction X, the transport direction Y, and the loading direction Z is performed by the positioning protrusions 61a to 61c and 62a, the elastic members 64a to 64c, and the pair of film holding portions 22a. That is, the instant film 28 built in the instant film pack 24 is aligned with respect to the transport roller pair incorporated in the camera body 11.

Figure 22:
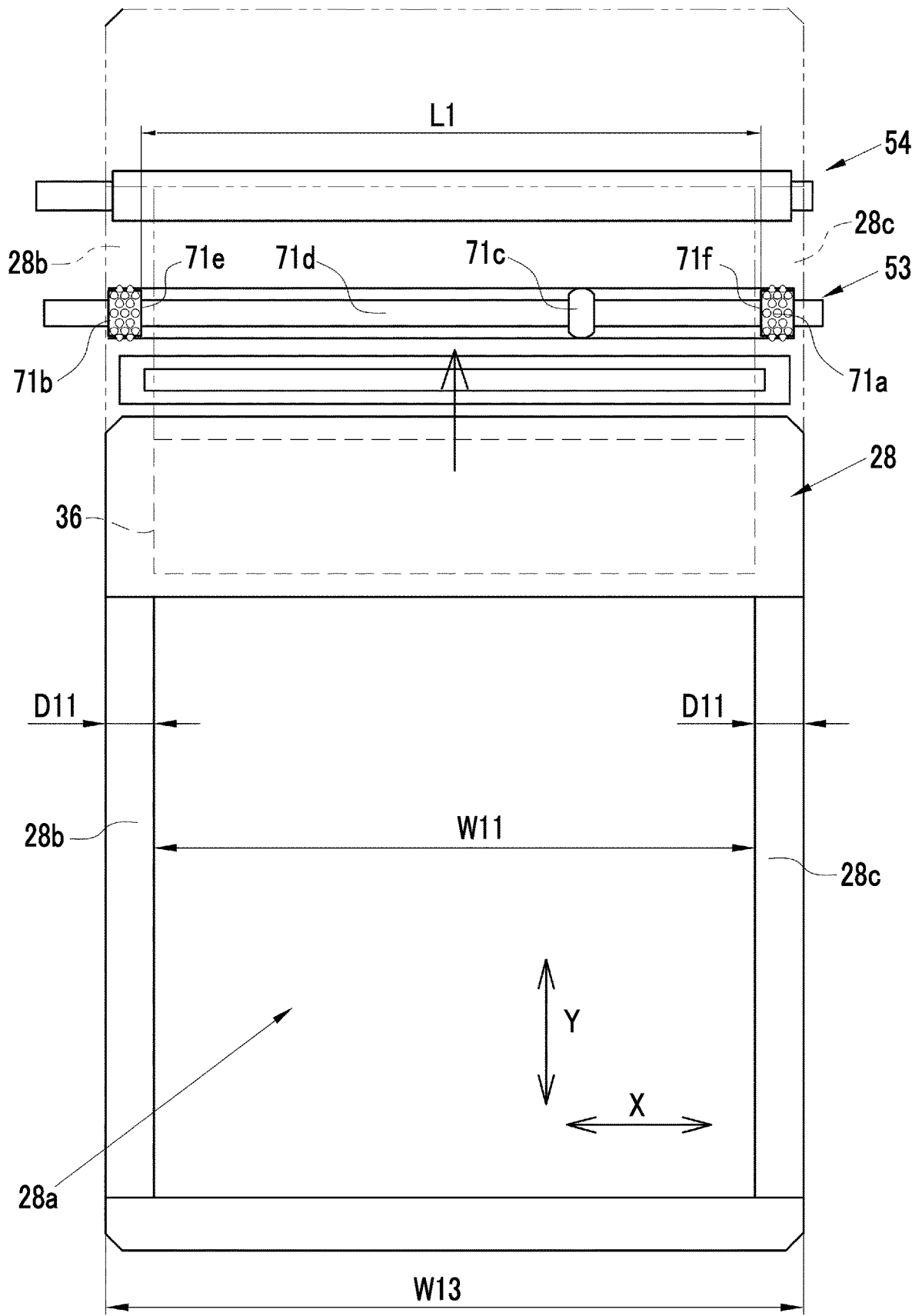
FIG. 22 is an explanatory diagram showing a positional relationship between the transport roller pair and the first instant film.

As shown in FIG. 22, the pair of spike roller members 71a and 71b are arranged at intervals from each other so as to correspond to the dimension of the instant film 28 in the width direction X. More specifically, a first distance L1 which is an interval between inner edges 71e and 71f of the pair of spike roller members 71a and 71b is longer than the dimension W11 of the exposure surface 28a in the width direction X and is shorter than the dimension W13 of the instant film 28 in the width direction X.

Figure 23:
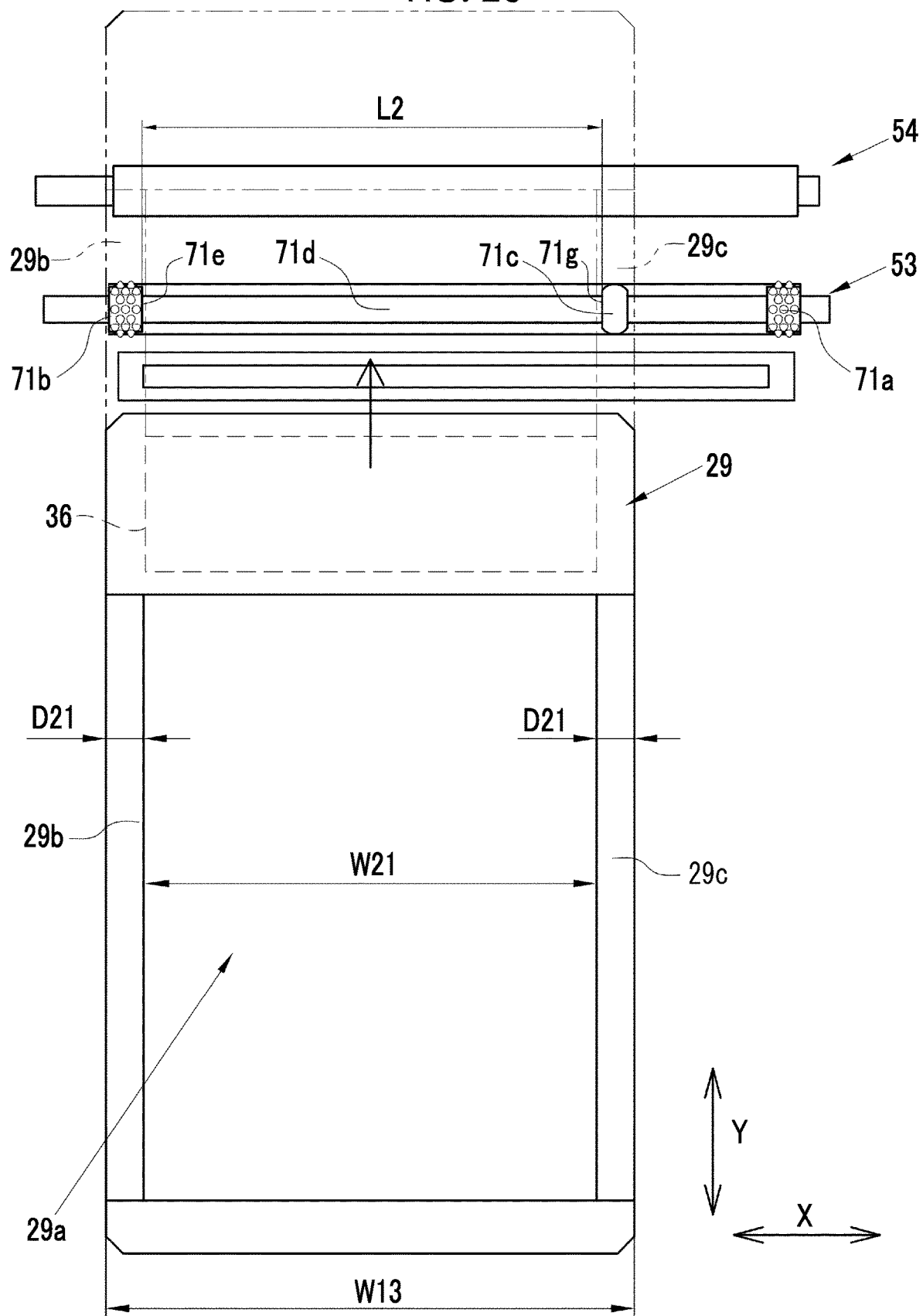
FIG. 23 is an explanatory diagram showing a positional relationship between the transport roller pair and the second instant film.

In a case where the transport roller pair 53 transports the instant film 28, the instant film 28 is aligned at a position at which both the side edge portions 28b and 28c of the instant film 28 are slidably in contact with the pair of spike roller members 71a and 71b, respectively, especially by the positioning of the positioning protrusions 61a to 61c and 62a in the width direction X. Accordingly, the pair of spike roller members 71a and 71b can transport the instant film 28 toward the spreading roller pair 54 by securely holding both the side edge portions 28b and 28c of the instant film 28. The inner edges 71e and 71f of the spike roller members 71a and 71b refer to edges arranged on sides of the rotational shaft 71d facing each other in the axial direction in a case where the sub roller member 71c is excluded. FIGS. 22 and 23 are diagrams of the instant films 28 and 29, the transport roller pair 53, the spreading roller pair 54, and the like as viewed from the exposure surfaces 28a and 29a.

In a case where the transport roller pair 53 transports the instant film 28, the sub roller member 71c is present between the spike roller members 71a and 71b at a position at which the developer pod 36 of the instant film 28 is pressed. However, as described above, since the sub roller member 71c is formed in a smooth curved surface shape that is convex outward, a pressing force is very small. Thus, the developer pod 36 is not crushed, and unevenness in the development does not occur only in the portion at which the sub roller member 71c touches the instant film 28. Since the outer diameter R2 of the sub roller member 71c is formed to be smaller than the effective outer diameter R1 of the spike roller member 71a or 71b, it is possible to obtain a holding force in a case where the instant film 29 is transported while further reducing the pressing force on the instant film 28.

On the other hand, in a case where the instant film pack 25 is loaded into the film pack room 23, the positioning in the width direction X, the transport direction Y, and the loading direction Z is performed by the positioning grooves 65a and 65b, the elastic members 64a and 64b, and the pair of film holding portions 22a. That is, the instant film 29 built in the instant film pack 25 is aligned with respect to the transport roller pair 53 incorporated in the camera body 11.

As shown in FIG. 23, the sub roller member 71c is disposed at an interval with respect to one spike roller member 71b so as to correspond to the dimension of the instant film 29 in the width direction X. More specifically, a second distance L2 which is an interval between inner edges 71e and 71g of one spike roller member 71b and the sub roller member 71c is longer than the dimension W21 of the exposure surface 29a in the width direction X and is shorter than the dimension W23 of the instant film 29 in the width direction X. Accordingly, since the spike roller member 71b securely holds one side edge portion 29b of the instant film 29 and the other side edge portion 29b and the sub roller member 71c are slidably in contact with each other, the instant film 29 can be transported toward the spreading roller pair 54.

Since the size of the instant film 29 is smaller than the size of the instant film 28, only one side edge portion is held and the other side edge portion is slidably in contact with the sub roller member, and thus, it is possible to obtain a sufficient torque. Accordingly, it is possible to transport the instant film. The inner edges 71e and 71g of the spike roller member 71b and the sub roller member 71c refer to edges arranged on sides of the rotational shaft 71d facing each other in the axial direction.

As described above, the instant film pack 25 is aligned with the film pack room 23 so as to be shifted to the right side surface 23a. Accordingly, as shown in FIG. 23, in a case where the transport roller pair 53 transports the instant film 29, the instant film 29 is aligned so as to correspond to the position at which one side edge portion 29b of the instant films 29 is slidably in contact with one spike roller member 71b and so as to correspond to the position at which the other side edge portion 29c of the instant film 29 is slidably in contact with the sub roller member 71c by the positioning of the positioning grooves 65a and 65b especially in the width direction X.

As described above, the dimensions D11 and D21 of both the side edge portions 28b and 28c of the instant film 28 and both the side edge portions 29b and 29c of the instant film 29 in the width direction X have dimensional differences. In the examples shown in FIGS. 9 and 13, a difference between D11 and D21 is 1 mm. That is, even though the instant film pack 25 and the instant film 29 are shifted to the right side surface 23a of the film pack room 23 as described above, the positions of one side edge portion 28b and one side edge portion 29b cannot be perfectly aligned. In a case where positions of lateral sides of the instant films 28 and 29 are aligned, positions of lateral sides of the exposure surfaces 28a and 29a are not aligned.

Figure 24:
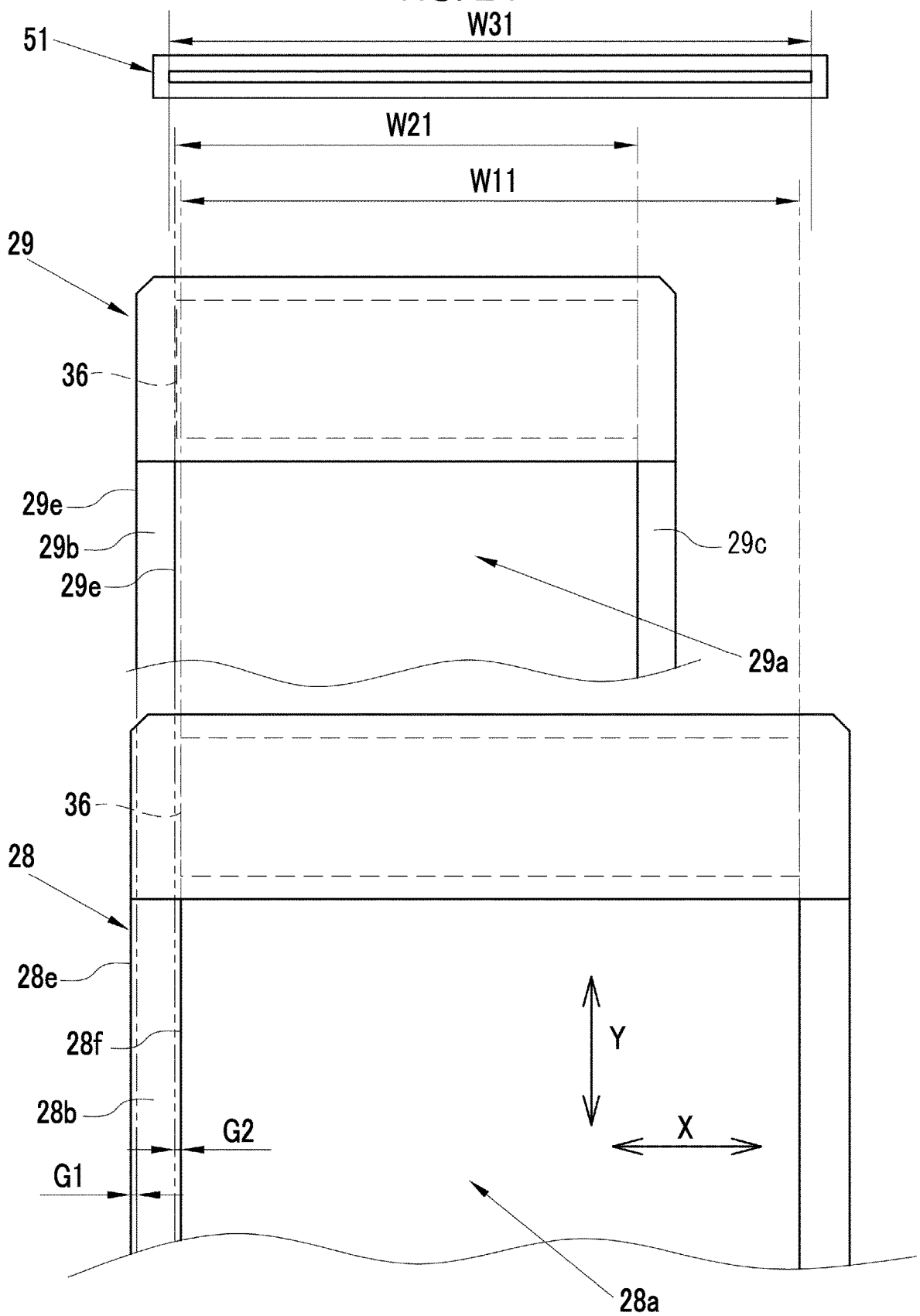
FIG. 24 is an explanatory diagram showing a positional relationship between the first instant film, the second instant film, and an exposure head.

Thus, in a case where the positioning is performed as described above, as shown in FIG. 24, a position of one lateral side 29e of the instant film 29 is slightly shifted inward with respect to a position of one lateral side 28e of the instant film 28. As described above, since the positioning groove 65a is formed inside the right side surface 23a of the film pack room 23, the film pack room can be transported by shifting a position thereof in this manner. FIG. 24 shows position comparison in a case where the instant films 28 and 29 are aligned by the positioning protrusions 61a to 61c and 62a or the positioning grooves 65a and 65b as described above and are transported by the transport roller pair 53. FIG. 23 is an explanatory diagram for comparison, and is different from an actual positional relationship between the instant films 28 and 29, the exposure head 51, and the like.

In the example shown in FIG. 24, a difference G1 between the position of one lateral side 28e of the instant film 28 and the position of one lateral side 29e of the instant film 29 is 0.5 mm. However, a difference between the dimensions D11 and D21 of the side edge portions 29b and 29c in the width direction X is 1 mm as described above, and the position of the lateral side 29f of the exposure surface 29a is still positioned outside the position of the lateral side 28f of the exposure surface 28a by a difference G2, and the difference G2 is 0.5 mm. A shift between the positions of the exposure surfaces 28b and 29b will be described later.

As described above, since the instant film packs 24 and 25 are aligned by the positioning protrusions 61a to 61c and 62a or the positioning grooves 65a and 65b and the instant film pack 25 is aligned with the film pack room 23 so as to be shifted to the right side surface 23a, in a case where the instant film packs 24 and 25 are loaded into the film pack room 23, both the cut-off portion 31b of the instant film pack 24 and the cut-off portion 31b of the instant film pack 25 are arranged at the same position. Thus, the claw member 57 enters the inside of the instant film packs 24 and 25 through the cut-off portions 31b by the claw member drive mechanism, and presses the film cover 30 or the foremost instant films 28 and 29. Accordingly, the film cover 30 or the foremost instant films 28 and 29 can be discharged outwards from the instant film packs 24 and 25 through the discharge ports 31c.

For example, the exposure head 51 includes a light source, a liquid crystal shutter, and a lens. The exposure head 51 is disposed on the upstream side of the transport roller pair 53 in the transport direction of the instant film and at a position facing the transport path of the instant film. The exposure head 51 irradiates the exposure surfaces 28a and 29a with line-shaped print light parallel to the width direction X of the instant films 28 and 29.

The exposure is started based on output signals from a detection sensor (not shown) that detects the passing of the distal end portions of the instant films 28 and 29 and a rotation speed detection sensor that detects a rotation speed of the capstan roller 71. Initially, the passing of the distal end portions is detected by a distal-end-portion passing detection sensor. The detection of the rotation speed is started by the rotation speed detection sensor based on the detection signal. When the rotation speed reaches a predetermined value, the detection sensor detects that the exposure surface 28a of the instant film 28 is transported to a position facing the exposure head 51. Accordingly, the exposure by the exposure head 51 is started.

The exposure by the exposure head 51 is switched according to the signal of the detection switch 78 provided in the film pack room 23. As shown in (A) of FIG. 25, the detection switch 78 includes a press portion 78a, a spring, a contact (both not shown), a case 78b holding these components, and the like. The detection switch 78 is provided on the left side surface 23b of the film pack room 23. The case 78b is fitted into an opening portion 23g formed in the left side surface 23b of the film pack room 23, and does not protrude to the inside of the film pack room 23.

As described above, since the instant film pack 25 is aligned with the film pack room 23 so as to be shifted to the right side surface 23a, the instant film pack does not touch the detection switch 78. Since the instant film pack 24 touches the positioning protrusion 62a provided on the left side surface 23b, the instant film pack similarly touches the detection switch 78 provided on the left side surface 23b.

The press portion 78a has a fan shape. The press portion 78a is rotatably supported with respect to the case 78b via a rotational shaft 78c. The press portion 78a protrudes from the case 78b and enters the inside of the film pack room 23 by a spring incorporated in the case 78b.

Figure 25:
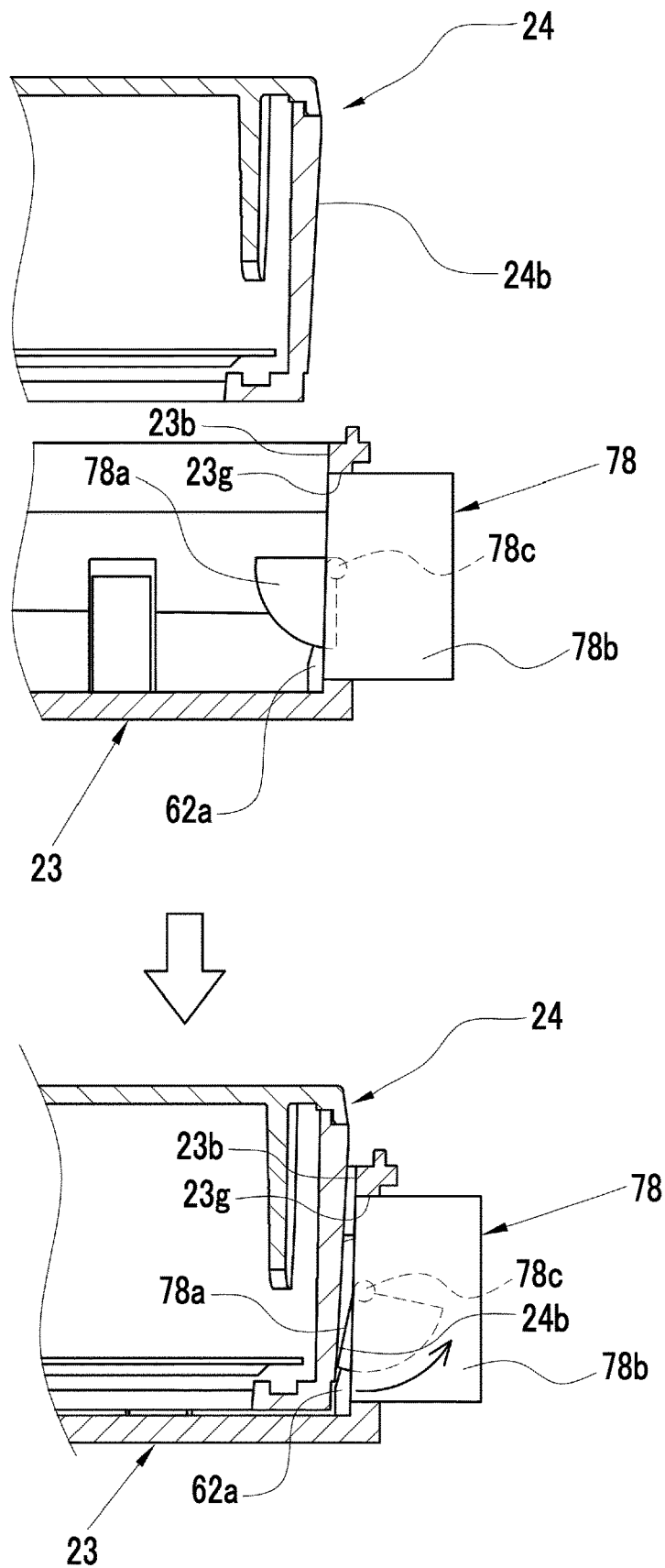
FIG. 25 is an explanatory diagram showing an operation of a detection switch.

As shown in (B) of FIG. 25, in a case where the instant film pack 24 is loaded into the film pack room 23, a side surface 24b of the instant film pack 24 presses the press portion 78a. The press portion 78a is pushed into the case 78b against the urging force of the spring, and presses an internal contact and the like. Accordingly, the detection switch 78 outputs an on signal. In a case where the press portion 78a is not pressed, the detection switch 78 outputs an off signal.

As described above, the dimension W21 of the exposure surface 29a of the instant film 29 in the width direction X is smaller than the dimension W11 of the exposure surface 28a of the instant film 28 in the width direction X. On the other hand, the position of the lateral side 29f of the exposure surface 29a is positioned outside the position of the lateral side 28f of the exposure surface 28a by the difference G2 by the positioning of the positioning protrusions 61a to 61c and 62a or the positioning grooves 65a and 65b (see FIG. 23). Even though the exposure surface 28a having a larger dimension in the width direction X is irradiated with the line-shaped print light to be applied to the exposure surfaces 28a and 29a, since one lateral side 29f of the exposure surface 29a is positioned outside the lateral side 28f of the exposure surface 28a, the exposure can be performed by the difference G2. Thus, in the exposure head 51 of the present embodiment, a maximum irradiation range W31 of the line-shaped print light is set to be larger than the dimension W11 of the exposure surface 28a in the width direction X. In a case where the instant films 28 and 29 illustrated above are used, it is preferable that the maximum irradiation range W31 of the line-shaped print light is set to be about 1 mm larger than the dimension W11 of the exposure surface 28a in the width direction X.

As shown in FIG. 24, the exposure head 51 emits line-shaped print light in a case where the on signal is output from the detection switch 78, that is, case where the instant film 28 having a large dimension in the width direction X is conveyed. Irradiation is performed according to the dimension W11 in the width direction X of the exposure surface 28a. Accordingly, an image can be formed over the entire surface of the exposure surface 28a. On the other hand, case where the off signal is output from the detection switch 78, that is, case where the instant film 29 having a small width direction is conveyed, the exposure head 51 emits line-shaped print light according to the dimension W21 in the width direction X of the exposure surface 29a. At this time, the position of the lateral side 29f of the exposure surface 29a is positioned outside the position of the lateral side 28f of the exposure surface 28a by the difference G2. However, since the maximum irradiation range W31 of the exposure head 51 with the print light is set to be large, an image can be formed over the entire surface of the exposure surface 29a.

As described above, in the digital camera 10 including a printer, two types of instant films 28 and 29 can be used at low cost by selectively loading any one of the instant film packs 24 and 25 into the film pack room 23 without taking an effort of part replacement. Although it is not necessary to replace parts such as a transport roller, the instant films 28 and 29 can be reliably transported to the outside of the instant film packs 24 and 25, and an image can be recorded.

In the above embodiment, an example in which a transport device for an instant film is applied to the digital camera including a printer is used, but the present invention is not limited thereto, and may be applied to a printer. For example, in the printer unit 13 similar to the above embodiment and a device main body having the printer unit, a printer in which any one of the instant film pack 24 or 25 is loaded into the film pack room 23, image data is received by using wireless communication from an electronic device such as a smartphone, and image is printed on the instant films 28 and 29 based on the received image data is preferable.

EXPLANATION OF REFERENCES

10: digital camera including printer
11: camera body
12: imaging unit
13: printer unit
15: imaging window
16A: release switch
16B: release switch
17: rear display unit
18: operation unit
18a: menu switch
18b: print switch
19: imaging optical system
20: solid-state imaging element
21: film discharge port
22: loading cover
22a: film holding portion
22c: hinge portion
23: film pack room
23a: right side surface
23b: left side surface
23c: bottom surface
23d: top surface
23e: front surface
23f: cut-off portion
23g: opening portion
24, 25: instant film pack
24a, 24b: side surface
24c: L-shaped protrusion
24d: bottom surface
24e: top surface
25a, 25b: side surface
25c: bottom surface
25d: protrusion
25e: front surface
25f, 25g: rib
25h: top surface
26: case
27: film press plate
27a, 27b: sheet
27c, 27e: opening
27d, 27f: hole
27g, 27h: lower end portion
28, 29: instant film
28a, 29a: exposure surface
28b, 28c, 29b, 29c: side edge portion
28e, 28f, 29e, 29f: lateral side
30: film cover
31: case member 31a: exposure opening
31b: cut-off portion
31c: discharge port
31d: light shielding seal
32: cover
32a: opening
32b: unit support protrusion
32c: pair of caulking pins
32d: support piece
33: mask sheet
33a: screen opening
34: photosensitive sheet
35: cover sheet
36 developer pod
37 trap portion
38 developer
39 gap
40 positive image observation surface
51 exposure head
52 roller drive mechanism
53 transport roller pair
54 spreading roller pair
56 spreading control member
56a: support member
57 claw member
58 ejection guide
61a: positioning protrusion
61b: positioning protrusion
61c: positioning protrusion
62a: positioning protrusion
63a: L-shaped cut-off portion
64a: elastic member
64b: elastic member
64c: elastic member
65a: positioning groove
65b: positioning groove
66: reversal loading prevention cut-off portion
67: press member
67a: distal end portion
67b: rotational shaft
68: holding frame
69: spring
71: capstan roller
71a: spike roller member
71b: spike roller member
71c: sub roller member
71d: rotational shaft
71e: inner edge
71f: inner edge
71g: inner edge
72: pinch roller
72a: roller member
72b: rotational shaft
73: spreading roller
74: spreading roller
76: spring
77: spring
78: detection switch
78a: press portion
78b: case
78c: rotational shaft
CLX: center line
D11, D21: dimension
G1, G2: difference
H11, H21: dimension
L1: first distance
L2: second distance
P: exposure position
R1: effective outer diameter
R2: outer diameter
RM: maximum outer diameter
RO minimum outer diameter
SL1, SL2, W11, W12, W13, W21, W22, W23: dimensions
W31: maximum irradiation range

What is claimed is:

1. A transport device for an instant film comprising:
a transport roller pair that includes a capstan roller and a pinch roller facing the capstan roller, and transports any one of a first instant film or a second instant film having a smaller dimension in a width direction than the first instant film in a transport direction orthogonal to the width direction by rotation of the capstan roller and the pinch roller,
wherein the capstan roller includes:
a rotational shaft;
a pair of spike roller members that are provided at both ends of the rotational shaft and have a plurality of convex portions on a circumferential surface, the pair of spike roller members being arranged at intervals from each other so as to correspond to the dimension of the first instant film in the width direction; and
a sub roller member that is provided at the rotational shaft, and is positioned between the pair of spike roller members, the sub roller member being disposed at an interval with respect to one of the pair of spike roller members so as to correspond to the dimension of the second instant film in the width direction,
the pair of spike roller members and the pinch roller transport the first instant film in a state of pinching both side edge portions of the first instant film, and
one of the pair of spike roller members and the pinch roller transport the second instant film in a state where one of the pair of spike roller members and the pinch roller pinch one of side edge portions of the second instant film and the sub roller member is slidably in contact with the other of the side edge portions of the second instant film.

2. The transport device for an instant film according to claim 1, further comprising:
a first positioning unit that includes a surface that aligns the first instant film so as to correspond to a position at which both the side edge portions of the first instant film are slidably in contact with the pair of spike roller members in a case where the transport roller pair transports the first instant film; and
a second positioning unit that includes a surface that aligns the second instant film so as to correspond to a position at which one of the side edge portions of the second instant film is slidably in contact with one of the pair of spike roller members and a position at which the other of the side edge portions of the second instant film is slidably in contact with the sub roller in a case where the transport roller pair transports the second instant film.

3. The transport device for an instant film according to claim 2,
wherein the sub roller member is formed in a smooth curved surface shape in which a cross section cut along a plane including an axial direction and a diametrical direction is convex outward.

4. The transport device for an instant film according to claim 1, wherein, in a case where an average value of a maximum outer diameter including a distal end of each convex portion of the plurality of convex portions of the spike roller member and a minimum outer diameter not including each convex portion of the plurality of convex portions is an effective outer diameter of the spike roller member, an outer diameter of the sub roller member is smaller than the effective outer diameter and is larger than the minimum outer diameter.

5. The transport device for an instant film according to claim 1,
wherein a dimension of the sub roller member in a width direction is smaller than a dimension of the spike roller member in a width direction.

6. A printer comprising:
the transport device for an instant film according to claim 1, the instant film having a mask sheet, a photosensitive sheet pasted onto the mask sheet, a cover sheet pasted onto the photosensitive sheet and having a front surface side as an exposure surface, and a developer pod provided at a distal end portion in a transport direction orthogonal to a width direction of the exposure surface and containing developer;
a spreading roller pair that spreads the developer between the photosensitive sheet and the cover sheet by being disposed on a downstream side of the transport roller pair in the transport direction, and sandwiching the instant film to crush the developer pod; and
an exposure head that is provided on an upstream side of the spreading roller pair in the transport direction and irradiates the exposure surface of the instant film transported by the transport roller pair with line-shaped print light parallel to the width direction of the exposure surface.

7. A digital camera including a printer comprising:
the printer according to claim 6; and
an imaging unit that includes an imaging optical system, captures a subject image, and outputs image data to the printer.

* * * * *